US 11,804,057 B1

(12) United States Patent
Toffey et al.

(10) Patent No.: US 11,804,057 B1
(45) Date of Patent: Oct. 31, 2023

(54) COMPUTER SYSTEMS AND COMPUTER-IMPLEMENTED METHODS UTILIZING A DIGITAL ASSET GENERATION PLATFORM FOR CLASSIFYING DATA STRUCTURES

(71) Applicant: LiquidX, Inc., New York, NY (US)

(72) Inventors: James Toffey, New York, NY (US); Frank Dimarco, New York, NY (US); Coby Dodd, New York, NY (US); Shayan Hemmatiyan, New York, NY (US); Venkat Naidu, New York, NY (US); Edmond Costantini, New York, NY (US); Mark Alexander, New York, NY (US); Vishal Panchamia, New York, NY (US)

(73) Assignee: LiquidX, Inc., New York, NY (US)

(*) Notice: Subject to any disclaimer, the term of this patent is extended or adjusted under 35 U.S.C. 154(b) by 0 days.

(21) Appl. No.: 18/189,078

(22) Filed: Mar. 23, 2023

(51) Int. Cl.
*G06V 30/42* (2022.01)
*G06V 30/14* (2022.01)
*G06V 10/82* (2022.01)

(52) U.S. Cl.
CPC ............ *G06V 30/42* (2022.01); *G06V 10/82* (2022.01); *G06V 30/1448* (2022.01)

(58) Field of Classification Search
CPC ..... G06V 30/42; G06V 10/82; G06V 30/1448
See application file for complete search history.

(56) References Cited

U.S. PATENT DOCUMENTS

| | | | | |
|---|---|---|---|---|
| 11,023,720 | B1* | 6/2021 | Desai | G06F 40/258 |
| 11,270,147 | B1* | 3/2022 | Jagannathan | G06V 10/44 |
| 11,544,943 | B1* | 1/2023 | Rimchala | G06V 10/82 |
| 11,631,266 | B2* | 4/2023 | Sampath | G06V 30/412 |
| | | | | 382/157 |
| 2021/0019512 | A1* | 1/2021 | Uppal | G06V 10/454 |
| 2021/0103695 | A1* | 4/2021 | Morariu | G06N 5/046 |
| 2021/0271872 | A1* | 9/2021 | Gupta | G06V 30/153 |
| 2021/0286989 | A1* | 9/2021 | Zhong | G06F 40/177 |
| 2021/0397737 | A1* | 12/2021 | De Berker | G06V 30/19167 |
| 2022/0019840 | A1* | 1/2022 | Xie | G06Q 30/0601 |

(Continued)

OTHER PUBLICATIONS

Vu, H.M., et al., "Revising FUNSD Dataset for Key-Value Detection in Document Images", arXiv:2010.05322v1 [cs.CV] Oct. 11, 2020.*

*Primary Examiner* — Xuemei G Chen
(74) *Attorney, Agent, or Firm* — Greenberg Traurig, LLP

(57) ABSTRACT

The techniques described herein relate to a systems and methods for a digital asset generation platform. The digital asset generation platform may ingest an ingest input. The digital asset generation platform may utilize a document identification engine corresponding to a first stage of a multi-stage convolutional neural network for identifying document types of documents. The digital asset generation platform may utilize an object detector engine corresponding to a second stage of the multi-stage convolutional neural network for detecting a dynamic mapping in the digital file. The digital asset generation platform may utilize a post-processing engine for classifying the dynamic mapping in the at least one digital file. The digital asset generation platform may dynamically generate a digital asset representative of the document based on the key value data pairs extracted from the dynamic mapping.

20 Claims, 24 Drawing Sheets

(56) References Cited

U.S. PATENT DOCUMENTS

| | | | |
|---|---|---|---|
| 2022/0156300 A1* | 5/2022 | Paruchuri | G06F 16/322 |
| 2022/0171967 A1* | 6/2022 | Reisswig | G06V 30/414 |
| 2022/0198390 A1* | 6/2022 | DeLuca | G06Q 30/0629 |
| 2022/0309813 A1* | 9/2022 | Melchy | G06N 3/045 |
| 2022/0318559 A1* | 10/2022 | Shen | G06V 10/82 |
| 2022/0335073 A1* | 10/2022 | Semenov | G06F 16/3347 |
| 2023/0015846 A1* | 1/2023 | Toffey | G06V 30/42 |
| 2023/0065915 A1* | 3/2023 | Berestovsky | G06V 30/414 |
| 2023/0120865 A1* | 4/2023 | Nascimento | G06V 30/40 |
| | | | 705/44 |
| 2023/0132720 A1* | 5/2023 | Khmaissia | G06N 3/088 |
| | | | 382/181 |
| 2023/0134651 A1* | 5/2023 | Agbamu | G06K 19/06037 |
| | | | 705/325 |

* cited by examiner

Map your source file fields

MAPPED FIELDS (5)

| Source File | Formatting | InBlock Field | Global Field | |
|---|---|---|---|---|
| Loan Reference | Text | Invoice Number | ☐ | ✗ |
| Loan Start Date | MM/DD/YYYY | Invoice Date | ☐ | ✗ |
| Loan Maturity Date | MM/DD/YYYY | Invoice Due Date | ☐ | ✗ |
| Loan Tenor Days | Text | Tenor | ☐ | ✗ |
| Loan Principal Amount | Text | Face Value | ☐ | ✗ |

Clear All

STATIC FIELDS (0)

InBlock Field | Static value

INVOICE LINE ITEMS

Run Template

FIG. 7

FIG. 16

COMPUTER SYSTEMS AND COMPUTER-IMPLEMENTED METHODS UTILIZING A DIGITAL ASSET GENERATION PLATFORM FOR CLASSIFYING DATA STRUCTURES

FIELD OF THE DISCLOSURE

Generally, the present disclosure is directed to computer-implemented methods and computer systems configured for a digital asset generation platform for classifying data structures.

BACKGROUND

Text recognition and detection of complex documents is difficult. For example, the documents might not be complete, or they might be missing data or include mistakes.

SUMMARY

In some aspects, the techniques described herein relate to a computer-implemented method including: ingesting, by at least one processor of a digital asset generation platform, an ingest input that includes at least one digital file in at least one digital format for a digital representation of one or more documents; utilizing, by the at least one processor of the digital asset generation platform, a document identification engine corresponding to a first stage of a multi-stage convolutional neural network for identifying one or more document types of the one or more documents by automatically: identifying at least one data object model of one or more data object models for the one or more documents; wherein the at least one data object model corresponds to the one or more document types; utilizing, by the at least one processor of the digital asset generation platform, an object detector engine corresponding to a second stage of the multi-stage convolutional neural network for detecting a dynamic mapping in the at least one digital file by automatically: iteratively generating, by the at least one processor of the digital asset generation platform, one or more fiducial markings overlaid on one or more data elements in the at least one digital file based at least in part on the at least one data object model; identifying, for each of the one or more fiducial markings, a spatial correlation between: a respective fiducial marking of the one or more fiducial markings, and a respective data element of the one or more data elements; and detecting, for each respective fiducial marking of the one or more fiducial markings associated with a respective spatial correlation meeting or exceeding a loss metric criterion, the dynamic mapping between the respective fiducial marking and the respective data element of the one or more data elements; utilizing, by the at least one processor of the digital asset generation platform, a post-processing engine for classifying the dynamic mapping in the at least one digital file by automatically: extracting one or more key value data pairs from the dynamic mapping between the respective fiducial marking and the respective data element of the one or more data elements; and dynamically generating, by the at least one processor of the digital asset generation platform, a digital asset representative of the one or more documents based on the one or more key value data pairs extracted from the dynamic mapping between each fiducial marking of the one or more fiducial markings and the respective data element of the one or more data elements.

In some aspects, the techniques described herein relate to a computer-implemented method, further including: utilizing, by the at least one processor of the digital asset generation platform, a dynamic mapping configurator for identifying mapping templates for the one or more documents by automatically: selecting, from one or more mapping templates, a mapping template for the at least one data object model; and identifying one or more training values of the mapping template; and utilizing, by the at least one processor of the digital asset generation platform, the dynamic mapping configurator for classifying the one or more key value data pairs based on the mapping templates by automatically: generating the digital asset including the one or more key value data pairs by comparing the one or more training values with the one or more key value data pairs.

In some aspects, the techniques described herein relate to a computer-implemented method, further including: utilizing a signature identity recognition engine corresponding to a third stage of the multi-stage convolutional neural network for identifying one or more digital objects in the dynamic mapping in the at least one digital file by automatically: extracting the one or more digital objects from the dynamic mapping between the respective fiducial marking and the respective data element of the one or more data elements; and dynamically generating, by the at least one processor of the digital asset generation platform, the digital asset representative of the one or more documents based on the one or more key value data pairs and the one or more digital objects.

In some aspects, the techniques described herein relate to a computer-implemented method, further including: utilizing, by the at least one processor of the digital asset generation platform, an object identifier engine to extract one or more text objects from the dynamic mapping; and utilizing, by the at least one processor of the digital asset generation platform, the post-processing engine to extract the one or more key value data pairs from the dynamic mapping based on the one or more text objects.

In some aspects, the techniques described herein relate to a computer-implemented method, further including: utilizing, by the at least one processor of the digital asset generation platform, an object identifier engine to extract one or more text objects from the at least one digital file based at least in part on the at least one data object model; and utilizing, by the at least one processor of the digital asset generation platform, the post-processing engine to extract the one or more key value data pairs from the dynamic mapping based on the one or more text objects.

In some aspects, the techniques described herein relate to a computer-implemented method, wherein dynamically generating the digital asset further includes: generating, based on the one or more key value data pairs, a multi-cell matrix with at least one header cell; and generating the digital asset including the one or more key value data pairs in the multi-cell matrix.

In some aspects, the techniques described herein relate to a computer-implemented method, wherein the post-processing engine includes at least one of, but not limited to: an entity relationship mapping engine, a natural language processing engine; and a legal entity recognition engine.

In some aspects, the techniques described herein relate to a computer-implemented method, further including: automatically training, by the at least one processor of the digital asset generation platform, the multi-stage convolutional neural network to generate the digital asset based on one or more feedback inputs for the digital asset.

In some aspects, the techniques described herein relate to at least one computer-readable storage medium encoded with computer-executable instructions that, when executed by at least one processor, cause the at least one processor to carry out a computer-implemented method of: ingesting an ingest input that includes at least one digital file in at least one digital format for a digital representation of one or more documents; utilizing a document identification engine corresponding to a first stage of a multi-stage convolutional neural network for identifying one or more document types of the one or more documents by automatically: identify at least one data object model of one or more data object models for the one or more documents; wherein the at least one data object model corresponds to the one or more document types; utilizing an object detector engine corresponding to a second stage of the multi-stage convolutional neural network for detecting a dynamic mapping in the at least one digital file by automatically: iteratively generating one or more fiducial markings overlaid on one or more data elements in the at least one digital file based at least in part on the at least one data object model; identifying, for each of the one or more fiducial markings, a spatial correlation between: a respective fiducial marking of the one or more fiducial markings, and a respective data element of the one or more data elements; and detecting, for each respective fiducial marking of the one or more fiducial markings associated with a respective spatial correlation meeting or exceeding a loss metric criterion, the dynamic mapping between the respective fiducial marking and the respective data element of the one or more data elements; utilizing a post-processing engine for classifying the dynamic mapping in the at least one digital file by automatically: extracting one or more key value data pairs from the dynamic mapping between the respective fiducial marking and the respective data element of the one or more data elements; dynamically generating a digital asset representative of the one or more documents based on the one or more key value data pairs extracted from the dynamic mapping between each fiducial marking of the one or more fiducial markings and the respective data element of the one or more data elements; and automatically training the multi-stage convolutional neural network to generate the digital asset based on one or more feedback inputs for the digital as set.

In some aspects, the techniques described herein relate to a computer-implemented method, further including: utilizing a dynamic mapping configurator for identifying mapping templates for the one or more documents by automatically: selecting, from one or more mapping templates, a mapping template for the at least one data object model; and identifying one or more training values of the mapping template; and utilizing the dynamic mapping configurator for classifying the one or more key value data pairs based on the mapping templates by automatically: generating the digital asset including the one or more key value data pairs by comparing the one or more training values with the one or more key value data pairs.

In some aspects, the techniques described herein relate to a computer-implemented method, further including: utilizing a signature identity recognition engine corresponding to a third stage of the multi-stage convolutional neural network for identifying one or more digital objects in the dynamic mapping in the at least one digital file by automatically: extracting the one or more digital objects from the dynamic mapping between the respective fiducial marking and the respective data element of the one or more data elements; and dynamically generating the digital asset representative of the one or more documents based on the one or more key value data pairs and the one or more digital objects.

In some aspects, the techniques described herein relate to a computer-implemented method, further including: utilizing an object identifier engine to extract one or more text objects from the dynamic mapping; and utilizing the post-processing engine to extract the one or more key value data pairs from the dynamic mapping based on the one or more text objects.

In some aspects, the techniques described herein relate to a computer-implemented method, further including: utilizing an object identifier engine to extract one or more text objects from the at least one digital file based at least in part on the at least one data object model; and utilizing the post-processing engine to extract the one or more key value data pairs from the dynamic mapping based on the one or more text objects.

In some aspects, the techniques described herein relate to a computer-implemented method, wherein dynamically generating the digital asset further includes: generating, based on the one or more key value data pairs, a multi-cell matrix with at least one header cell; and generating the digital asset including the one or more key value data pairs in the multi-cell matrix.

In some aspects, the techniques described herein relate to a computer-implemented method, further including: automatically training the multi-stage convolutional neural network responsive to identifying whether the at least one header cell is associated with the one or more key value data pairs.

In some aspects, the techniques described herein relate to a system including: a non-transient computer memory, storing software instructions; and at least one processor of a computing device associated with a user; wherein when the at least one processor executes the software instructions, the computing device is programmed to: ingest, by the at least one processor of a digital asset generation platform, an ingest input that includes at least one digital file in one or more digital formats for a digital representation of one or more documents; utilize a document identification engine corresponding to a first stage of a multi-stage convolutional neural network for identifying one or more document types of the one or more documents by automatically: identifying at least one data object model of one or more data object models for the one or more documents; wherein the at least one data object model corresponds to the one or more document types; utilize an object detector engine corresponding to a second stage of the multi-stage convolutional neural network for detecting a dynamic mapping in the at least one digital file by automatically: generating one or more fiducial markings overlaid on one or more data elements in the at least one digital file based at least in part on the at least one data object model; identify, for each of the one or more fiducial markings, a spatial correlation between: a respective fiducial marking of the one or more fiducial markings, and a respective data element of the one or more data elements; and detecting, for each respective fiducial marking of the one or more fiducial markings associated with a respective spatial correlation meeting or exceeding a loss metric criterion, the dynamic mapping between the respective fiducial marking and the respective data element of the one or more data elements; and utilizing a post-processing engine for classifying the dynamic mapping in the at least one digital file by automatically: extracting one or more key value data pairs from the dynamic mapping between the respective fiducial marking and the respective data element of the one or more data elements.

In some aspects, the techniques described herein relate to a system, wherein the computing device is further programmed to: utilize a dynamic mapping configurator for identifying mapping templates for the one or more documents by automatically: selecting, from one or more mapping templates, a mapping template for the at least one data object model; and identifying one or more training values of the mapping template; and utilize the dynamic mapping configurator for classifying the one or more key value data pairs based on the mapping templates by automatically: generating a digital asset representative of the one or more documents, the digital asset including the one or more key value data pairs by comparing the one or more training values with the one or more key value data pairs.

In some aspects, the techniques described herein relate to a system, wherein the computing device is further programmed to: utilize a signature identity recognition engine corresponding to a third stage of the multi-stage convolutional neural network for identifying one or more digital objects in the dynamic mapping in the at least one digital file by automatically: extracting the one or more digital objects from the dynamic mapping between the respective fiducial marking and the respective data element of the one or more data elements; and dynamically generate a digital asset that is representative of the one or more documents based on the one or more key value data pairs and the one or more digital objects.

In some aspects, the techniques described herein relate to a system, wherein the computing device is further programmed to: utilize an object identifier engine to extract one or more text objects from the dynamic mapping; and utilize the post-processing engine to extract the one or more key value data pairs from the dynamic mapping based on the one or more text objects.

In some aspects, the techniques described herein relate to a system, wherein the computing device is further programmed to: utilize an object identifier engine to extract one or more text objects from the at least one digital file based at least in part on the at least one data object model; and utilize the post-processing engine to extract the one or more key value data pairs from the dynamic mapping based on the one or more text objects.

BRIEF DESCRIPTION OF THE DRAWINGS

Embodiments of the present disclosure, briefly summarized above and discussed in greater detail below, may be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

FIGS. 1A-23 are representative of some exemplary aspects of the present disclosure in accordance with at least some principles of at least some embodiments of the present disclosure.

Figure 1A:
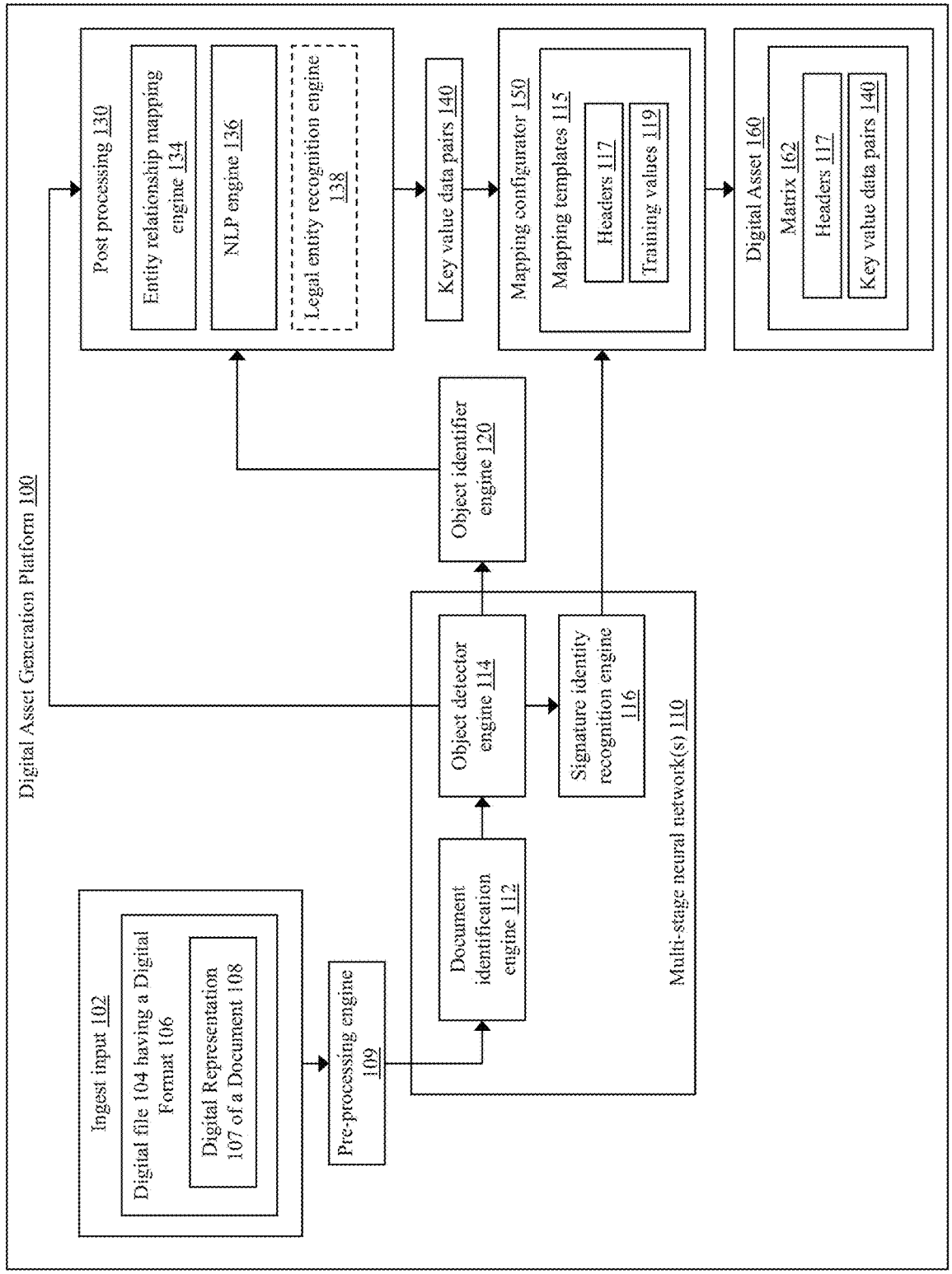

To facilitate understanding, identical reference numerals have been used, where possible, to designate identical elements that are common to the figures. The figures are not drawn to scale and may be simplified representations for the sake of clarity. It is contemplated that elements and features of one embodiment may be beneficially incorporated in other embodiments without further recitation.

DETAILED DESCRIPTION

A technological problem with optical recognition is that it may be slow or require costly manual review by subject matter experts. For example, existing optical recognition approaches may take one minute or more to extract text from documents (depending, e.g., on document size), the typical optical recognition techniques may be configured for general purpose optical character recognition (OCR) and thus may be missing domain-specific capabilities (e.g., representing the data conveyed in remittance advice, invoice, and insurance documents, etc.), and thus the typical optical recognition techniques may be unable to accurately and/or efficiently extract information from domain-specific documents.

Existing optical recognition approaches might be unable to extract information presented as a key and its value without separation. For example, existing optical recognition approaches may be unable to process an invoice to extract, e.g., invoice number, payment date, itemized prices, etc. Existing optical recognition approaches might be unable to extract information when only the value is presented. For example, company names, address, and dates. Existing optical recognition approaches might be unable to extract information from documents that blend paragraphs, tables, and logos. Therefore, manually scraping or parsing documents such as remittance advice, invoice, and insurance documents are cumbersome.

To provide technical solutions to these and other technological problems, the present disclosure may use artificial intelligence (AI) techniques to digitize documents. The present disclosure may apply, on the digitized documents, deep learning-based OCR to extract text, keys, and values from documents. The present disclosure may apply machine learning to the extracted information to impute or correct missing or mistaken information. For example, the convolutional neural network model may be trained, and GPU/CPU optimized specifically for financial documents.

Another technical solution provided by the digital asset generation platform is a dynamic mapping configurator. The digital asset generation platform may include mapping templates. The mapping templates may be created for each document. The digital asset generation platform may receive, from a user, targets for unstructured documents.

The dynamic mapping configurator may manage mapping templates. The dynamic mapping configurator may create or generate a mapping template. The dynamic mapping configurator may create mapping templates in various formats. For example, the mapping template may have a format of .CSV, .XLSX, .XLS, .XML, or .EDI.

The dynamic mapping configurator may manage map values for the mapping template. The dynamic mapping configurator may generate map values that include a source. For example, the source may include a loan reference expressed as a string, an issuance date expressed as a date/time, a maturity date expressed as date/time, a loan amount expressed as an integer, and a discount percent expressed as a percentage.

The dynamic mapping configurator may generate mapped values for the mapping template. For example, the mapped value may include an invoice number expressed as a string, and invoice date expressed as a date/time, and invoice due date expressed as a date/time, a face value expressed as an integer, and a margin rate expressed as a percentage. The dynamic mapping configurator may generate static values for the mapping template. For example, the static value may include a currency expressed as a code in the value expressed as dollars.

The dynamic mapping configurator may associate each source value with a corresponding mapped value. For example, the dynamic mapping configurator may associate the loan reference with the invoice number, the issuance date with the invoice date, the maturity date with the invoice due date, the loan amount with the face value, and the discount percent with the margin rate.

The dynamic mapping configurator may apply the mapping templates. The dynamic mapping configurator may apply the mapping templates manually or automatically based on how incoming data is configured. For example, the dynamic mapping configurator may apply the mapping templates based on the input document.

The dynamic mapping configurator may include an ingestion pipeline. The ingestion pipeline may include a parser, a mapper, and the validator. The ingestion pipeline may be responsible for data extraction, mapping, normalization, and validation. The dynamic mapping configurator may control the ingestion pipeline. For example, each step in this process may be triggered automatically.

The dynamic mapping configurator may include an asset master. The asset master may be a centralized repository that stores digitized asset data. The dynamic mapping configurator may store digitized asset data in the asset master.

The dynamic mapping configurator may include a workflow database. The workflow database may include modules to engage in subsequent workflows. The dynamic mapping configurator may send the asset data from the asset master to the workflow database.

The dynamic mapping configurator may display a user interface for creating mapping templates. The dynamic mapping configurator may receive selections to configure and create the mapping templates. For example, the dynamic mapping configurator may receive the selections from a business user. The dynamic mapping configurator may receive selections of asset types. For example, the dynamic mapping configurator may receive a selection that the asset type is an invoice. The dynamic mapping configurator may assign the mapping templates to companies.

The dynamic mapping configurator may display a user interface for creating mapping templates. The dynamic mapping configurator may receive a source file via the user interface. The dynamic mapping configurator may create or generate the mapping templates based on the source file that may be uploaded to the user interface.

The dynamic mapping configurator may display a user interface for creating mapping templates. The user interface may include fields that are selectable for mapping. The dynamic mapping configurator may display the fields from the source file. The dynamic mapping configurator may receive the selections of the fields. The dynamic mapping configurator may receive selections of one or more the fields from the source file in order to establish the mappings.

The dynamic mapping configurator may display a user interface for creating mapping templates. The dynamic mapping configurator may map the source file fields to known destination fields to normalize data during digitization of the documents. The dynamic mapping configurator may assign formatting requirements to define fields. For example, the dynamic mapping configurator may assign the date fields to define formatting logic.

The dynamic mapping configurator may display a user interface for creating mapping templates. The dynamic mapping configurator may display, in the user interface, values parsed from the documents. The user may preview the results of the mapping to ensure the values are accurate. The dynamic mapping configurator may receive verification inputs from the user to verify the accuracy of the values.

The dynamic mapping configurator may display a user interface for selecting mapping templates. The dynamic mapping configurator may display a request for a user to select the mapping template. The dynamic mapping configurator may receive a selection of the mapping template. The dynamic mapping configurator may display the selected mapping template. The dynamic mapping configurator may receive the selection during the parsing process. The dynamic mapping configurator may receive the selection during the parsing process either manually or automatically.

The dynamic mapping configurator may display a user interface for displaying results from applying mapping templates. The dynamic mapping configurator may leverage the mapping templates by applying the mapping templates to the documents to obtain parsed results from the documents. The dynamic mapping configurator may display the parsed results. The dynamic mapping configurator may normalize the parsed results into normalized data. The dynamic mapping configurator may validate the normalized data. The dynamic mapping configurator may save the normalized and validated data. The dynamic mapping configurator may display a selectable option to digitize the normalized and validated data.

The technical improvements described herein may include a digital asset generation platform that includes a multi-stage deep learning and machine learning tool to parse and extract key value pairs from unstructured documents such as remittance advice, invoices, insurance policies, and bill of ladings. Additionally, the present disclosure may extract other text objects such as a logo, signature, QR, and graphics to identify documents and then map them to smart contracts.

The technical improvements described herein may include a unique Single Shot Detection (SSD) model, a tandem SSD and OCR model for key value extraction, and an overlap matrix method for extracting key values from tables. From the synergistic combination of these technologies and platforms, the digital asset generation platform may overcome numerous technical challenges and includes numerous technical solutions.

One technical solution provided by the digital asset generation platform is utilizing models to target specific complexities from the documents. In some embodiments, the model may be an SSD model developed to detect unique text objects for both unstructured key value pair extraction and other text object detection such as signature, LOGO, and QR for smart contract mapping. This model may utilize a loss function to localize document objects.

Another technical solution provided by the digital asset generation platform is that the model may be Natural Language Processing (NLP), which may be used for Named Entity Recognition (NER-Transformers) of text to parse key value pairs when only the value is presented (e.g., value only).

Another technical solution provided by the digital asset generation platform is that the model may be optimized OCR, which may be an optimized multistage OCR model, including, e.g., a GPU optimized multistage OCR model, that combines different deep learning and image processing models to OCR complex text. The model may support many languages such as English, Chinese, Arabic, German, French, and Spanish.

Another technical solution provided by the digital asset generation platform is that the optimized OCR may be a modified version of an OCR model. For example, the text recognition and detection models may be trained, and GPU/CPU optimized specifically for a particular domain, such as financial documents. This training may enhance the speed by more than one order of magnitude for the analysis of documents without losing any accuracy.

Another technical solution provided by the digital asset generation platform is that the Single Shot Detection model may effectively localize document objects such as tables, signatures, logos, QR, stamps, and graphics. In some embodiments, an asymmetric loss function may meet the loss metric criteria (e.g., non-negative and bounded). The asymmetric loss function may penalize the smaller bounding boxes from the ones that enclose the entire object (e.g., slightly bigger than the object) to ensure not losing any information during object localization. The asymmetric loss function may enable a more accurate and precise localization for parsing objects like tables and boxes. The unique SSD model may localize the document objects such as signatures, logos, tables, and other text objects.

Another technical solution provided by the digital asset generation platform is that the present disclosure includes a multi-stage convolutional neural network model for signature identification that may be utilized in mapping documents into smart contracts.

Another technical solution provided by the digital asset generation platform is utilizing the output of the SSD model (e.g., localized bounding boxes) and OCR text detection for key value pair extraction. For tables, the present disclosure may use a developed overlap matrix method to extract columns/cells from the tables.

Another technical solution provided by the digital asset generation platform is that in optical recognition tests of documents (e.g., financial documents) against the generic OCR modules executing on the same GPU configuration, the digital asset generation platform described herein outperformed these modules both in terms of speed and accuracy. The digital asset generation platform may include an OCR cloud service. The OCR cloud service may include a parser. The digital asset generation platform may identify the location of the document and fields or bounding boxes.

Another technical solution provided by the digital asset generation platform is handling new styles and/or types of documents and/or new languages. The digital asset generation platform may monitor performance against new documents with the new style. For example, when the detection scores are smaller than a certain threshold, the documents may be marked as a new style.

Another technical solution provided by the digital asset generation platform is that when the digital asset generation platform identifies a new language or characters, the digital asset generation platform may be tested against the new language and characters. Based on the tests, the digital asset generation platform may retrain the NLP model to capture the new language and characters. These documents may be annotated or labeled (e.g., not real-time). The digital asset generation platform may annotate parts of the document. The annotations may identify signatures, logos, tables, stamps, and/or graphics. The digital asset generation platform may up sample the annotated documents and then retrain both SSD and NLP models depending on where the models failed.

The digital asset generation platform may receive data input. The input may include an image PNG, JPG, and/or PDF. The digital asset generation platform may preprocess documents. Preprocessing documents may include converting a PDF to PNG, image normalization, image binarization, and dots per inch conversion (DPI). The digital asset generation platform may use format recognition using single shot detection (SSD). The digital asset generation platform may provide the input document to the SSD, which may classify and localize the data elements. The data elements may include tables, paragraphs, logos, and signatures. The digital asset generation platform may classify files by document type. For example, the digital asset generation platform may classify invoices, agreements, bills of lading (BOLs), credit notes, POs, RAs, and/or policies.

The digital asset generation platform may include OCR techniques. The digital asset generation platform may include post-processing to obtain key value pairs. Post-processing may include signature identity recognition, entity relationship mapping using NLP, fuzzy matching, and legal entity recognition (LER). The digital asset generation platform may generate an output, which may include JSON, documents, and/or objects for smart contracts.

The digital asset generation platform may use a multi-stage convolutional neural network (CNN) to analyze tables, paragraphs, logos, signatures, and/or any other data element. The data elements may be provided to a multi-stage CNN, such as for classification. The multi-stage CNN may output associations between the data. For example, the associations may be between various names and companies.

The multi-stage CNN may include an input, a kernel, and a feature map. The multi-stage CNN may include a locally connected layer, a convolutional layer, and a fully connected layer. The digital asset generation platform may include a multi-stage CNN with a neural network with a convolutional operation instead of matrix multiplication at least one of the layers. The multi-stage CNN may include a neural network (NN) with one or more layers. For example, the depth of the neural network may be 3 or 4. The multi-stage CNN may include a recurrent neural network.

The multi-stage CNN may receive raw OCR output and SSD output. The multi-stage CNN may create a table with values (e.g., multi key value pairs to identify the output). The multi-stage CNN may create a matrix by identifying overlap between cells (e.g., overlap matrix). The multi-stage CNN may identify the header cell for tables. The multi-stage CNN may extract key value pairs from the table. The multi-stage CNN may output the key value pairs.

The multi-stage CNN may be used for object classification and localization. The multi-stage CNN may include one or more convolutional layers for feature extraction from an input. The layers may be knowledge layers and task-specific knowledge layers. The layers may include an SSD, which may be a single shot multi-box detector with a residual layer. The multi-stage CNN may include fully connected layers as classifiers. The fully connected layers may generate outputs at the head or top of the network.

The multi-stage CNN may include a backbone with a convolution block and up-sample block. The head (e.g., top of the convolution network) may provide output to a feature extractor or object detector with one or more convolution and up-sample blocks. The feature extractor or object detector may provide output to a feature pyramid. The feature pyramid may provide output to one or more heads, which may include convolution blocks. The heads may provide output to a YOLO loss function, which may include cross entropy loss, L1 loss, and objectless loss. The multi-stage CNN may include a concatenate block with a convolution filter based on filter size in dim and out dim with inject points.

The digital asset generation platform may include learning from small sets of training data. For example, the digital asset generation platform may learn from less than 40 image documents. The SSD may up-sample data with synthetic images. The SSD may use a generational adversarial network (GAN) that includes a deep transformer network. The SSD may up-sample data with external documents. The SSD may include a classier model to detect signature, logo, paragraph, table, box, QR code, stamps, graphics, and companies.

The multi-stage CNN may include signature classifier transformations. The signature classifier transformations may include transformations from the original representation of the document, e.g.: to change background, add parallel light with angle, add spotlight, crop, rotate, among other transformations or any combination thereof. The multi-stage CNN signature classifier training may maintain training and validation accuracy. The multi-stage CNN signature classifier training may include one or more serial convolution layers for processing the document.

The digital asset generation platform may apply deep OCR to the data. The digital asset generation platform may validate the key value pairs. The digital asset generation platform may use the validation to retrain the SSD and NLP models. The digital asset generation platform may use an all parser to parse the key value pairs.

Another technical solution provided by the digital asset generation platform is a loss function to ensure that the entire object is captured for document object detection. The loss function may maintain the loss metric criteria (e.g., non-negative and bounded). The asymmetric loss function may ensure that the bounding boxes enclose the entire object such as a table, graphic, signature, and/or other object. The loss function may penalize the bounding box if it does not enclose the object.

The digital asset generation platform may use Named Entity Recognition (NER-NLP) to advance key value extraction and Legal Sentiment Analysis. The digital asset generation platform may use NLP for document type recognition. For example, the digital asset generation platform may identify that a document type is an insurance policy, a permitted limit due date is 15 days, and the no fee period is 60 days.

The digital asset generation platform may create combined (e.g., augmented) bounding boxes for key value pair search. The digital asset generation platform may receive raw OCR output. The digital asset generation platform may apply an algorithm (e.g., string-searching algorithm) to extract key value data pairs from bounding boxes. The digital asset generation platform may join bounding boxes horizontally by joining key value pairs on the same line. The digital asset generation platform may extract key value data pairs from newly created bounding boxes. The digital asset generation platform may output the extracted key value pairs.

The digital asset generation platform may include fuzzy matching with mapping templates. The digital asset generation platform may transform raw OCR output into key value pairs for unstructured documents. An ensemble of fuzzy matching models for different types of matching may be employed, may including simple text matching, target value matching, and table specific matching. Using the ensemble of fuzzy matching models, values may be matched to keys and the matched values may be target values, which may include payment number, invoice number, invoice date, currency, invoice amount, and amount paid.

The digital asset generation platform may include trained optical character recognition networks to detect value pairs. The optical recognition structures may receive an input, such as an image, PNG, JPG, and/or PDF. The trained optical character recognition networks may pre-process documents, which may include converting PDF to PNG, image normalization, image binarization, and dots per inch conversion (DPI). The trained optical character recognition networks may include post-processing to identify key value pair (KVP), which may include entity relationship mapping using NLP and fuzzy matching. The trained optical character recognition networks may produce an output, such as in a format of pkl, csv, and/or json.

The digital asset generation platform may generate horizontal augmented bounding boxes to further process OCR output. For example, and/original OCR output may include bounding boxes that are unlikely to contain both key names and their respective values. The distance search may be found to be inconsistent. The horizontally extended bounding boxes may include key value pairs on the same line joined together in the same bounding box. The digital asset generation platform may automatically extract the KVP in the same bounding box.

The digital asset generation platform may generate vertical augmented bounding boxes to further process OCR output. For example, the original OCR output might not extend to be multiple lines and values that appear under keys might not be combined. Vertically extended bounding boxes may include key value pairs that are horizontally aligned to be joined in the same bounding box. Trapezoidal visual bounding boxes may contain all text lines within them.

Character recognition and document processing models typically rely on known structures and format of documents in order to extract information. As a result, such models do not work with documents having even small changes in structure, layout, format, or other features. In view of the aforementioned technical features, the digital asset generation platform may overcome the technical difficulty of accurately processing differences in layout and format of different documents that may be normalized into viable key/value result sets that match up with expected data models for each asset type. The digital asset generation platform may overcome the technical difficulty of handling the conversion of scanned images into text and key/value pairs. The digital asset generation platform may overcome the technical difficulty of handling the text extraction and ultimate key/value extraction in non-structured document formats (.txt, .doc, .pdf, .msg) in addition to structured document formats (.tsv, .csv, .xls, .xlsx, .json, .xml). The digital asset generation platform may overcome the technical difficulty of sequencing of different stages of parsing/processing for potential extraction failure scenarios (standard text extraction, advanced text pattern searching, multiple stages of optical character recognition) for each incoming document format and asset type. The digital asset generation platform may overcome the technical difficulty of loading documents in user interfaces (UI) as opposed to loading documents via SFTP (SSH File Transfer Protocol). The digital asset generation platform may overcome the technical difficulty of giving users a comprehensive interface that allows them to configure templates and/or document source connections, test configurations and/or outputs and view and/or analyze asset data result sets. The digital asset generation platform may overcome the technical difficulty of document storage for each stage of the ingestion. The digital asset generation platform may overcome the technical difficulty of common asset storage of result set data that can be used by multiple applications.

In view of the aforementioned technical features, the digital asset generation platform may provide numerous technical advantages. The digital asset generation platform may advantageously enable common asset storage of result set data that can be used by multiple applications. The digital asset generation platform may advantageously enable the normalized key/value extraction of asset data regardless of incoming document format. The digital asset generation platform may advantageously enable the storage and display of an asset's history/life cycle. The digital asset generation platform may advantageously enable the aggregation of asset data for analysis and actioning. The digital asset generation platform may advantageously allow multiple users access to accurate and reliable asset data in a single platform. The digital asset generation platform may advantageously allow the user via a template to provide a global field to apply to every output asset, as it is read from the input (Global Fields). For example, a currency value that is provided in a particular location in an input file. The digital asset generation platform may advantageously allow the user to provide a static field to apply to every output asset, as defined by the user in the template (Static Fields). For example, a currency value that is specified by the template creator. The digital asset generation platform may advantageously allow the user to run the template as soon as a change is made to the template, so they can immediately see how it behaves (Run Template. The digital asset generation platform may advantageously allow the user to map specific fields in the incoming document to expected output fields (Mapped Fields). The digital asset generation platform may advantageously allow the user to specify formatting for dates for example: DD/MM/YYYY vs MM/DD/YYYY (Formatting). The digital asset generation platform may advantageously allow the user to specify a column and the value within the column which identifies the type of asset (Asset Filter Criteria).

Figure 1B:
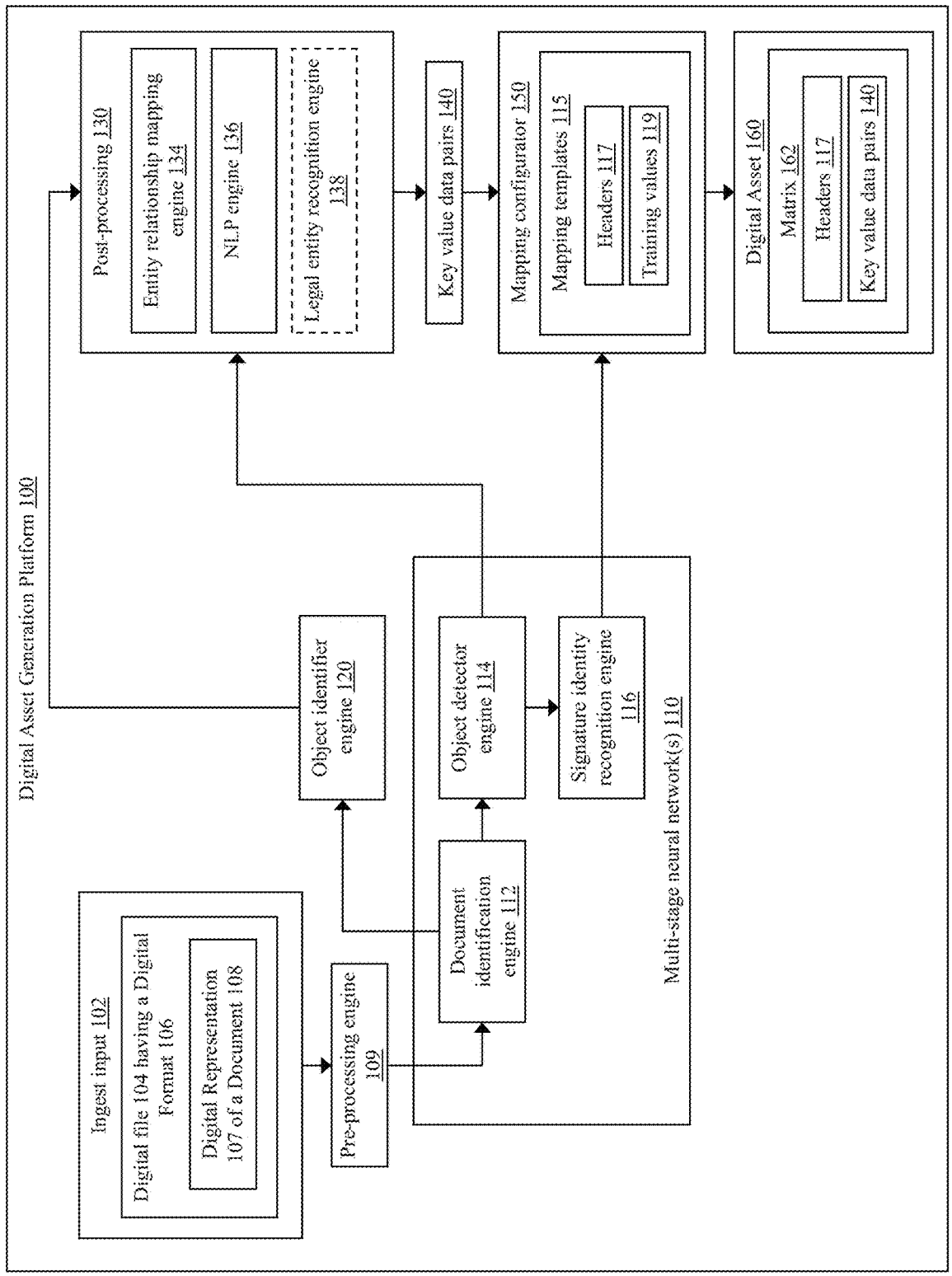

Now referring generally to FIG. 1A and FIG. 1B, to achieve these and other technical solutions to technological problems, the present disclosure may include a digital asset generation platform 100 and methods for use thereof. In some embodiments, the digital asset generation platform 100 may ingest an ingest input 102. The ingest input 102 may be a data package to be analyzed by the digital asset generation platform 100.

The ingest input 102 may include one or more digital files 104. The one or more digital files 104 may be any electronic file that may be stored in and accessed from a variety of computer devices. The one or more digital files 104 may be in one or more digital formats 106. For example, the one or more digital formats 106 may be an image PNG, JPG, or PDF.

In some embodiments, the at least one digital file 104 having the one or more digital formats 106 may be capturing at least one digital representation 107 of the one or more documents 108. The at least one digital representation 107 may be produced by a pre-processing engine 109 that may apply document processing activities on the one or more documents 108, such as but not limited to scanning, printing, taking a snapshot, among others or combinations thereof. The pre-processing engine 109 may preprocess the one or more documents 108 into the digital representation 107. For example, preprocessing the one or more documents 108 may include converting a PDF to PNG, image normalization, image binarization, dots per inch conversion (DPI), and/or removing noise from the images.

In some embodiments, the one or more documents 108 may be an information package represented by text, images, and/or visible content that may be manipulated by the document processing software (e.g., word processing programs, imaging programs, and/or presentation programs). For example, the one or more documents 108 may be remittance advice, invoices, insurance policies, bill of lading, other financial or non-financial document, and/or any combination thereof.

In some embodiments, the digital asset platform 100 may include a multi-stage convolutional neural network 110 for classifying the at least one digital representation 107 of the one or more documents 108. In some embodiments, the multi-stage convolutional neural network 110 may include three stages. The first stage may be the document identification engine 112, the second stage may be the object detector engine 114, and the third stage may be the signature identity recognition engine 116.

In some embodiments, the multi-stage convolutional neural network 110 may analyze objects such as tables, paragraphs, logos, and signatures. The multi-stage convolutional neural network 110 may include fully connected layers as classifiers. In some embodiments, the fully connected layers may generate outputs at the head or top of the network. In some embodiments, the multi-stage convolutional neural network 110 may include one or more layers. For example, the depth of the neural network may be 3 or 4. In some embodiments, other depths may be used, such as, e.g., 2, 3, 4, 5, 6, 7, 8, 9, 10 or more. In some embodiments, the multi-stage convolutional neural network 110 may include an input, a kernel, and a feature map. In some embodiments, the multi-stage convolutional neural network 110 may include a neural network with a convolutional operation instead of matrix multiplication at least one of the layers. In some embodiments, the multi-stage convolutional neural network 110 may include a locally connected layer, a convolutional layer, and a fully connected layer.

In some embodiments, the multi-stage convolutional neural network 110 may include, utilize, and/or be a cloud-based AI Computer Vision (CV), Computer Vision (CV), AI, Deep Learning (DL), Web Applications, Live video stream, and/or Live Analysis by CV. In some embodiments, the multi-stage convolutional neural network 110 may be configured to utilize one or more exemplary AI/computer vision techniques chosen from, but not limited to, decision trees, graph algorithm, boosting, support-vector machines, neural networks, nearest neighbor algorithms, Naive Bayes, bagging, random forests. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly received input data,
  vi) optionally and in parallel, continue to train the exemplary trained model with a predetermined periodicity.

In some embodiments and, optionally, in combination of any embodiment described above or below, the exemplary trained multi-stage convolutional neural network 110 may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained deep learning model may also be specified to include other parameters, including but not limited to, bias values/functions and/or aggregation functions. For example, an activation function of a node may be a step function, sine function, continuous or piecewise linear function, sigmoid function, hyperbolic tangent function, rectified linear activation function or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The multi-stage convolutional neural network 110 may include a document identification engine 112. In some embodiments, the document identification engine 112 corresponds to the first stage of the multi-stage convolutional neural network 110. In some embodiments, the document identification engine 112 may receive the ingest input 102 from the multi-stage convolutional neural network 110. In some embodiments, the document identification engine 112 may identify the type of the one or more documents 108. For example, the document identification engine 112 may classify the that one or more documents 108 is an invoice, agreement, BOLs, credit notes, PO, RA, policy, insurance policies, BOLs, and/or Master of Service agreements.

Figure 2:
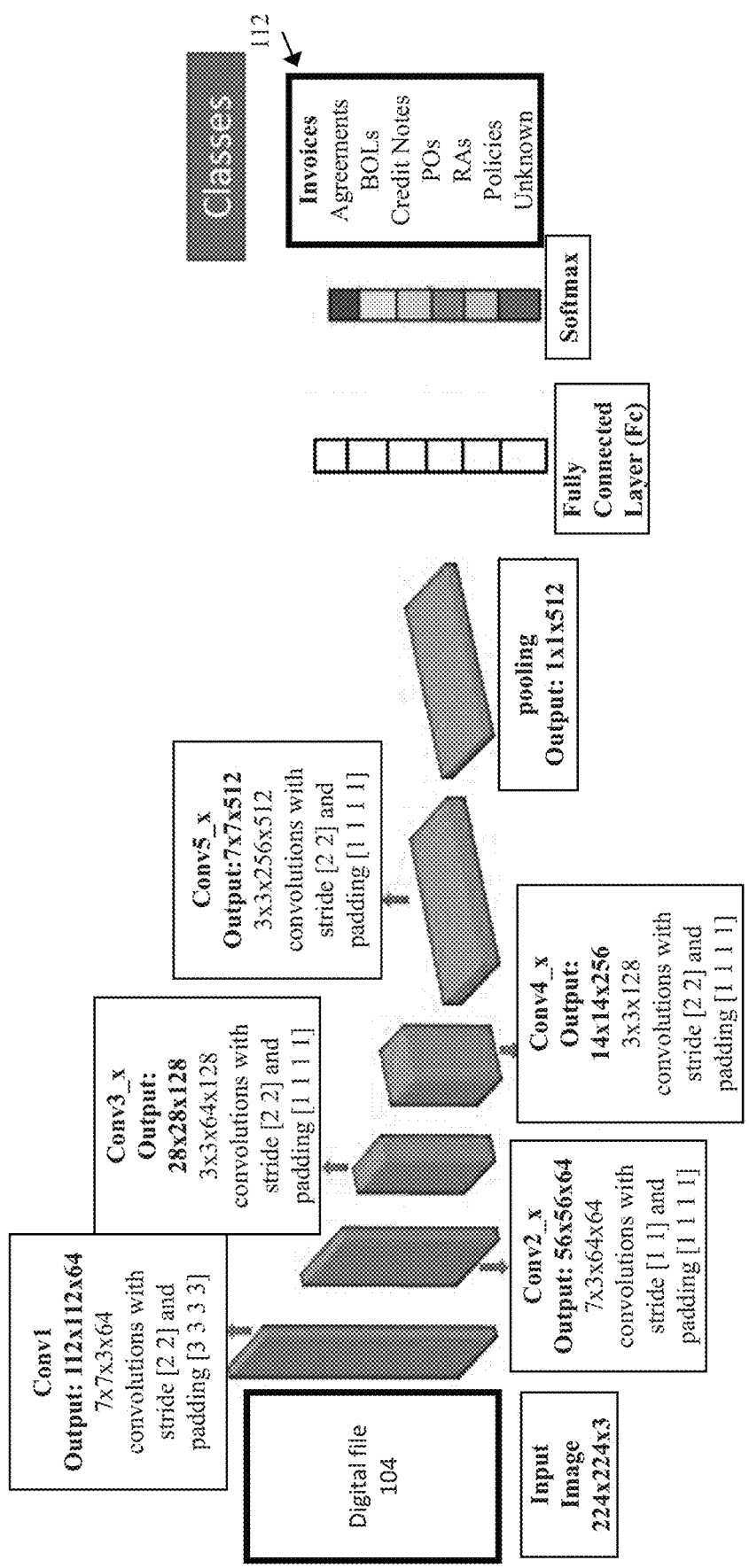

In some embodiments, the document identification engine 112 may identify at least one data object model of one or more data object models for the one or more documents 108. In some embodiments, as shown in FIG. 2, the document identification engine 112 may include a CNN with one or more layers for identifying the data object models from the digital file 104. The data object models may correspond to document types of the one or more documents 108 where each data object model corresponds to a particular document type. For example, the document type may be an invoice or an insurance policy. The one or more data object models may indicate the subject matter included in the one or more document 108, such as invoice, agreement, BOLs, credit notes, purchase order (PO), remittance advice (RA), policy, insurance policies, BOLs, and Master of Service agreements. An unknown class may refer to the class of inputs that don't have the criteria such as resolution, quality, and context for being a valid document (e.g., garbage identifier).

In some embodiments, the document identification engine 112 identifies one or more data elements to identify the data object model. For example, the one or more data elements may be a table in the one or more documents 108. In another example, the one or more data elements may be objects such as fields, logo, signature, QR, stamps, and/or graphics. In another example, the one or more data elements may be raw OCR output. In some embodiments, the document identification engine 112 may automatically detect one or more data elements from the at least one digital file 104 of the ingest input 102. The document identification engine 112 may use transform the digital file 104 to identify the elements. For example, the document identification engine 112 may transform the digital file with rotation, cropping and change of brightness. The document identification engine 112 may use a generation adversarial network that includes a deep transformer network to detect the one or more data elements.

In some embodiments, the document identification engine 112 may identify the object model based on the location of elements in the digital file 104. In some embodiments, the document identification engine 112 may identify the object model based on the location of where the elements load. In some embodiments, the document identification engine 112 may identify the type of the documents 108 based on the source of the ingest input 102. For example, the document identification engine 112 may identify the type of the documents 108 based whether the ingest input 102 was received via a user interface upload or via an SFTP connection. For each model, the document identification engine 112 may identify one or more digital formats 106 of the digital file 104. For example, for each asset type, there may be several different accepted document formats. In some embodiments, the document identification engine 112 may determine the digital format 106 of the documents 108. For example, the document identification engine 112 may determine the incoming document format by identifier for file formats (e.g., media type (MIME-type)). Upon determining the object model and the digital format 106, the document identification engine 112 can retrieve a corresponding mapping template 115 from the mapping configurator 150. The multi-stage convolutional neural network 110 may provide or transmit the mapping template 115 to the multi-stage convolutional neural network 110 for analysis of the elements. For example, once asset-type and document MIME-type are determined, the multi-stage convolutional neural network 110 can use the mapping templates 115 for data extraction and downstream processing.

In some embodiments, the document identification engine 112 can identify that the one or more data elements of the at least one digital file 104 are associated at least one data object model of one or more data object models. In some embodiments, the document identification engine 112 identifies the data object model based on the one or more data elements. For example, if the elements include a logo associated with insurance, then the document identification engine 112 may identify the data object model corresponding to the document type that is an insurance policy. In some embodiments, the document identification engine 112 may classify the one or more data elements based on the data object model. For example, if the document type is an invoice, the document identification engine 112 may classify the one or more data elements that have price as relevant document assets, and the one or more data elements that have a coupon as non-document assets. In another example, if the document type is an insurance policy, the models may document identification engine 112 may classify the one or more data elements as one or more declaration pages.

Figure 3:
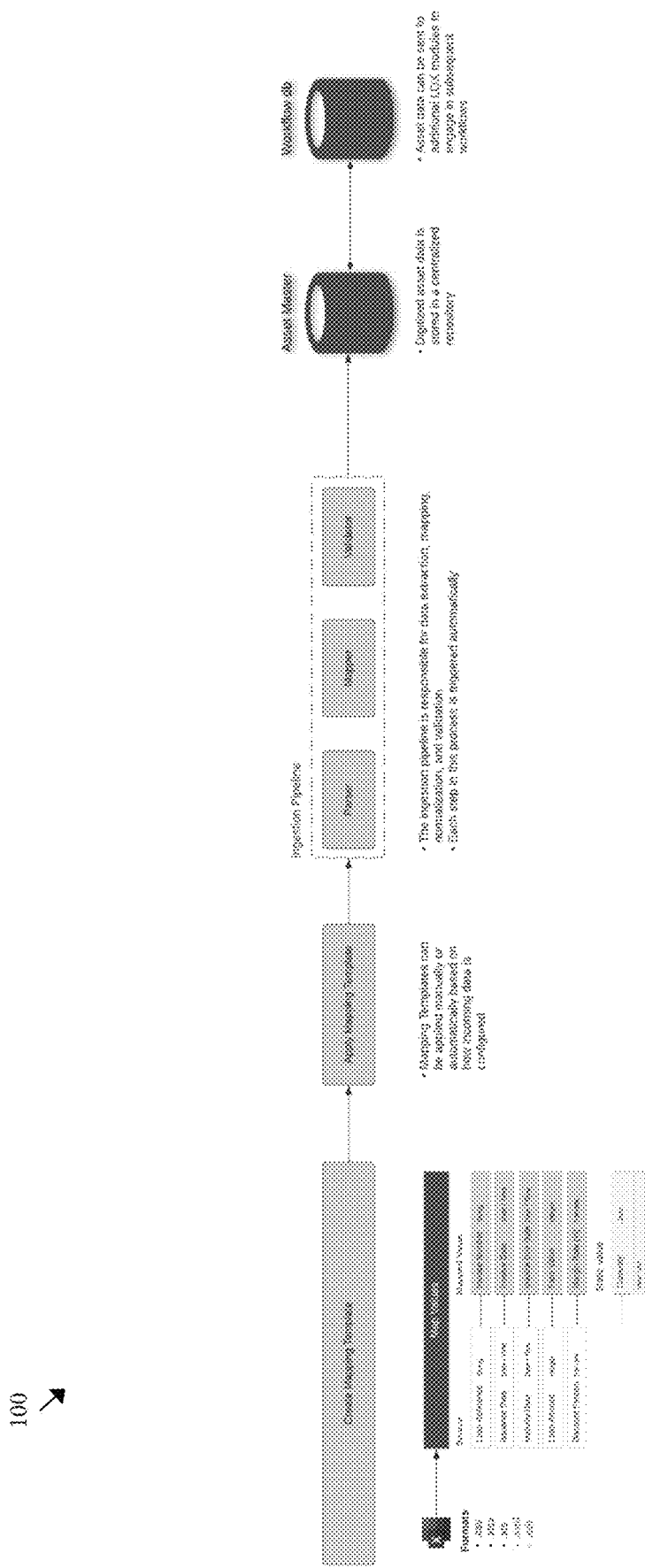

In some embodiments, the document identification engine 112 may identify the data object models by utilizing a dynamic mapping configurator 150 that maintains mapping templates 115. As shown in FIG. 3, the digital asset generation platform 100 may create mapping templates 115. In some embodiments, the digital asset generation platform 100 may utilize a dynamic mapping configurator 150 that maintains mapping templates 115 with which to analyze the one or more documents 108 received by the document identification engine 112. The mapping templates 115 may be representative of the one or more documents 108. The dynamic mapping configurator 150 may receive mapping templates 115 with which to analyze the one or more documents 108.

As shown in FIG. 3, the dynamic mapping configurator 150 may define map values (e.g., headers 117) for the mapping template 115 to be used to analyze the ingest input 102. The dynamic mapping configurator 150 may manage map values that include a source of the document 108. For example, the source may include a loan reference expressed as a string, an issuance date expressed as a date/time, a maturity date expressed as date/time, a loan amount expressed as an integer, and/or a discount percent expressed as a percentage. The dynamic mapping configurator 150 may map values that include mapped values for the mapping template 115. For example, the mapped values may include an invoice number expressed as a string, invoice due date expressed as a date/time, a face value expressed as an integer, and/or a margin rate expressed as a percentage. The dynamic mapping configurator 150 may manage static values for the mapping template 115. For example, the static value may include a currency expressed as a code in the value expressed as dollars.

The dynamic mapping configurator 150 may associate each source value with a corresponding mapped value. For example, the dynamic mapping configurator 150 may associate the loan reference with the invoice number, the issuance date with the invoice date, the maturity date with the invoice due date, the loan amount with the face value, and/or the discount percent with the margin rate.

Figure 4:
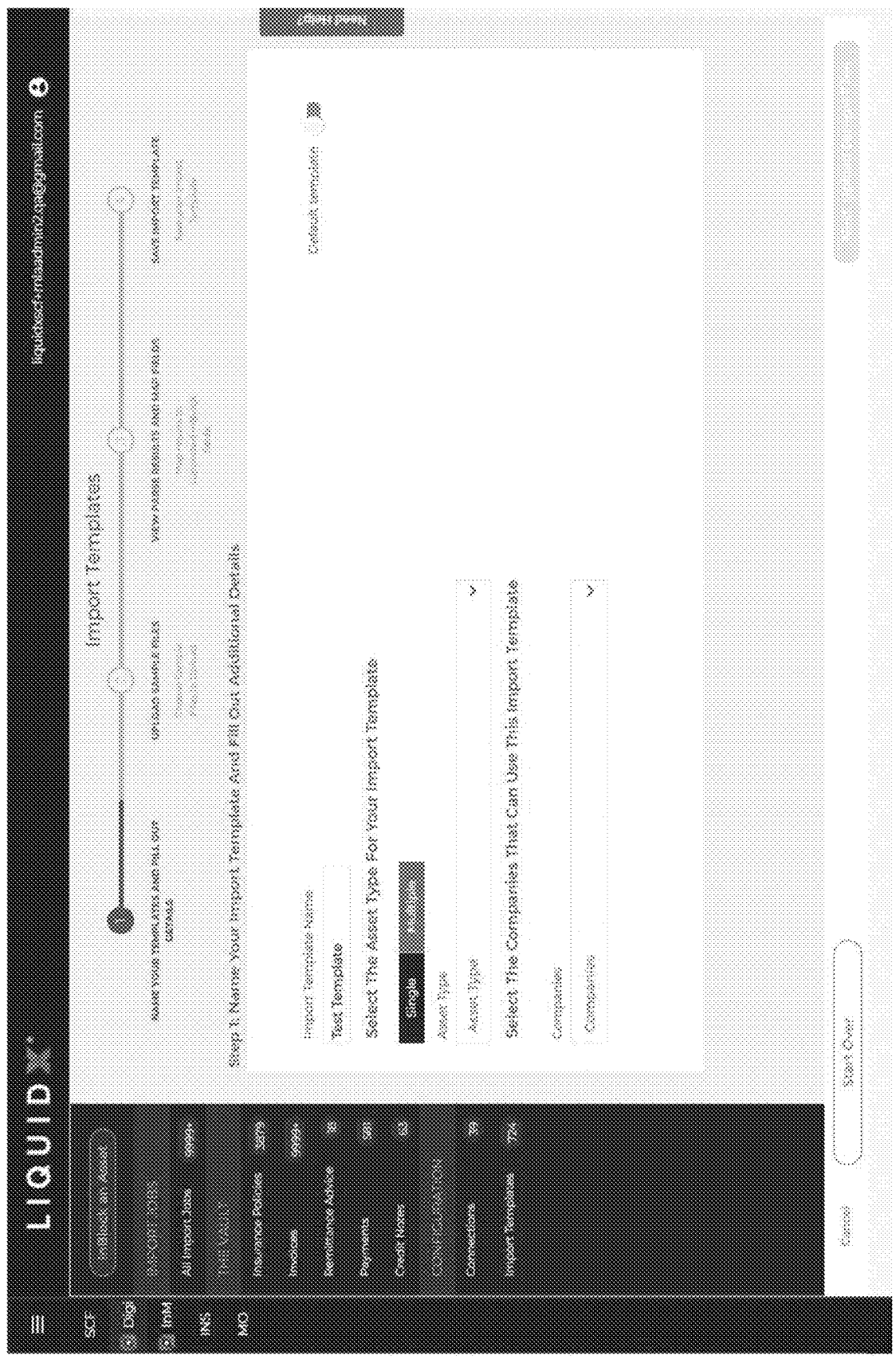

As shown in FIG. 4, the dynamic mapping configurator 150 may generate an interface to receive the mapping templates 115. The dynamic mapping configurator 150 may receive selections of document types associated with the mapping templates 115. For example, the document types may be asset types. In another example, the dynamic mapping configurator 150 may receive a selection that the asset type is an invoice. In some embodiments, the dynamic mapping configurator 150 may receive a selection for which companies are assigned to the mapping templates 115. For example, the document types may be a company associated with the ingest input 102.

The document types defined by the mapping templates 115 may correspond to the data object models identified by the document identification engine 112. In some embodiments, the document identification engine 112 may identify the data object models of the one or more documents 108 based on the document types defined by the one or more mapping templates 115. In some embodiments, the document identification engine 112 may compare the digital file 104 to the mapping templates 115 to identify the object model of the one or more documents 108 represented by the digital file 104. In some embodiments, the document identification engine 112 may select, from one or more mapping templates 115, a mapping template having a document type corresponding to the at least one data object model. The document identification engine 112 may utilize the mapped values of the selected mapping template to further analyze the ingest input 102.

Figure 5:
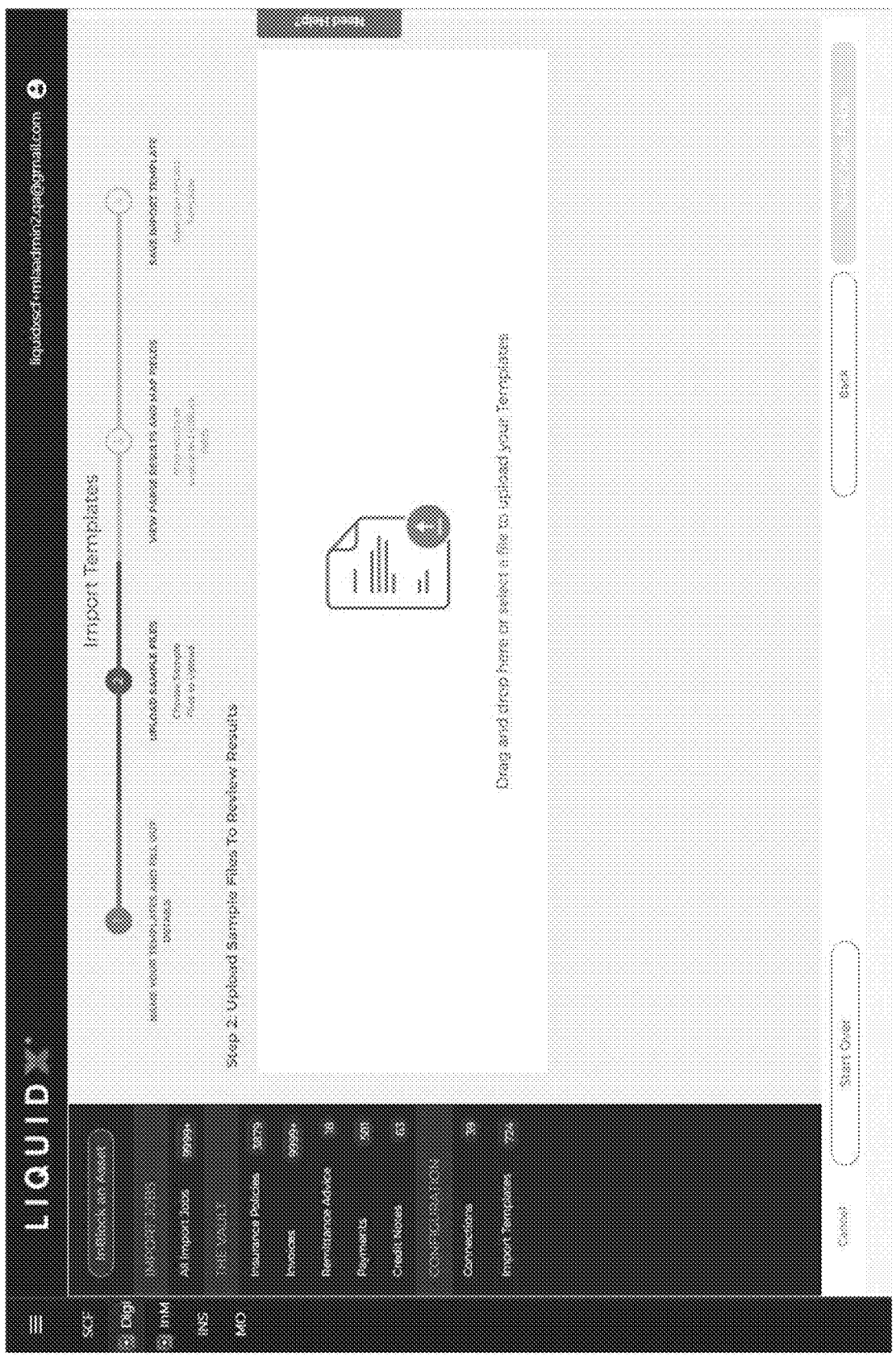

As shown in FIG. 5, the dynamic mapping configurator 150 may generate an interface for receiving mapping templates 115. The dynamic mapping configurator 150 may receive, via the interface, the mapping templates 115 as a file. The dynamic mapping configurator may create or generate the mapping templates 115 based on the file that may be uploaded. The dynamic mapping configurator 150 may create the mapping templates 115 in various formats.

For example, the mapping templates 115 may have a format of .CSV, .XLSX, .XLS, .XML, or .EDI.

In some embodiments, the digital asset generation platform 100 may train the multi-stage convolutional neural network 110 to capture the new language and characters. To assist with training, the digital asset generation platform 100 may receive mapping templates 115 that are annotated or labeled (e.g., not real-time). For example, mapping templates 115 may include elements with annotations such as signatures, logos, tables, stamps, and/or graphics. The object identifier engine 120 may up-sample data in the mapping templates 115. The object identifier engine 120 may use up sample data in the mapping templates 115 that include synthetic images. The digital asset generation platform 100 may up sample the annotated mapping templates 115 and then retrain the multi-stage convolutional neural network 110 depending on which the elements were not identified.

Figure 6:
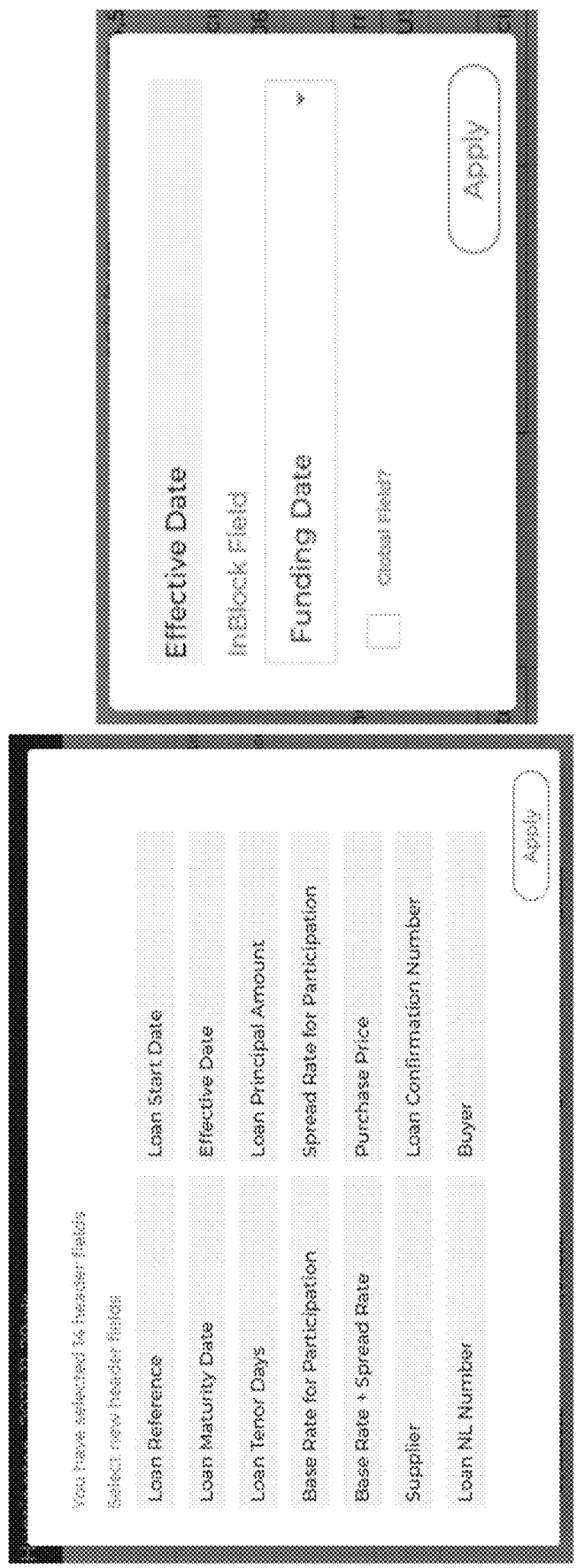

As shown in FIG. 6, the dynamic mapping configurator 150 may generate an interface for configuring headers 117 of the mapping templates 115. The headers 117 may be elements to search for in the ingest input 102, such as document date, document number, reference, discount, gross amount, payment document, payment date, currency, and payment amount. The dynamic mapping configurator 150 may display the headers 117 to be configured in the templates 115. For example, the dynamic mapping configurator 150 may search for the headers 117 in the digital file 104 to analyze the one or more documents 108. The dynamic mapping configurator 150 may receive, via the interface, configurations for the mapping template 115. The dynamic mapping configurator 150 may receive, via the interface, selections to configure and create the mapping templates 115. For example, the dynamic mapping configurator 150 may receive the selections from a user. The interface may include headers 117 that are selectable. The dynamic mapping configurator 150 may receive the selections of the headers 117. The dynamic mapping configurator 150 may receive selections of one or more the headers 117 to configure the templates 115.

As shown in FIG. 7, the dynamic mapping configurator 150 may generate an interface for associating headers 117 with training values 119 to configure the mapping templates 115. The dynamic mapping configurator may assign the training values 119 to known destination fields (e.g., headers 117) to train the dynamic mapping configurator 150 to normalize data during analysis of the ingest input 102. The dynamic mapping configurator 150 may assign formatting requirements to define the training values 119. For example, the dynamic mapping configurator 150 may assign the date fields to define formatting logic. In some embodiments, the dynamic mapping configurator 150 may receive, via the interface, regions of interest for the one or more documents 108. For example, the regions of interest may be areas of where to search for data in the one or more documents 108.

Figure 8:

As shown in FIG. 8, the dynamic mapping configurator 150 may display an interface for defining the training values 119 (e.g., mapped fields) of the mapping templates 115. The dynamic mapping configurator 150 may display, in the interface, training values 119 for the documents. The dynamic mapping configurator 150 may preview the results of the mapping to ensure the associations between the headers 117 and the training values 119 are accurate. The dynamic mapping configurator 150 may receive verification inputs via the interface to verify the accuracy of associations between the headers 117 and the training values 119.

Figure 9:
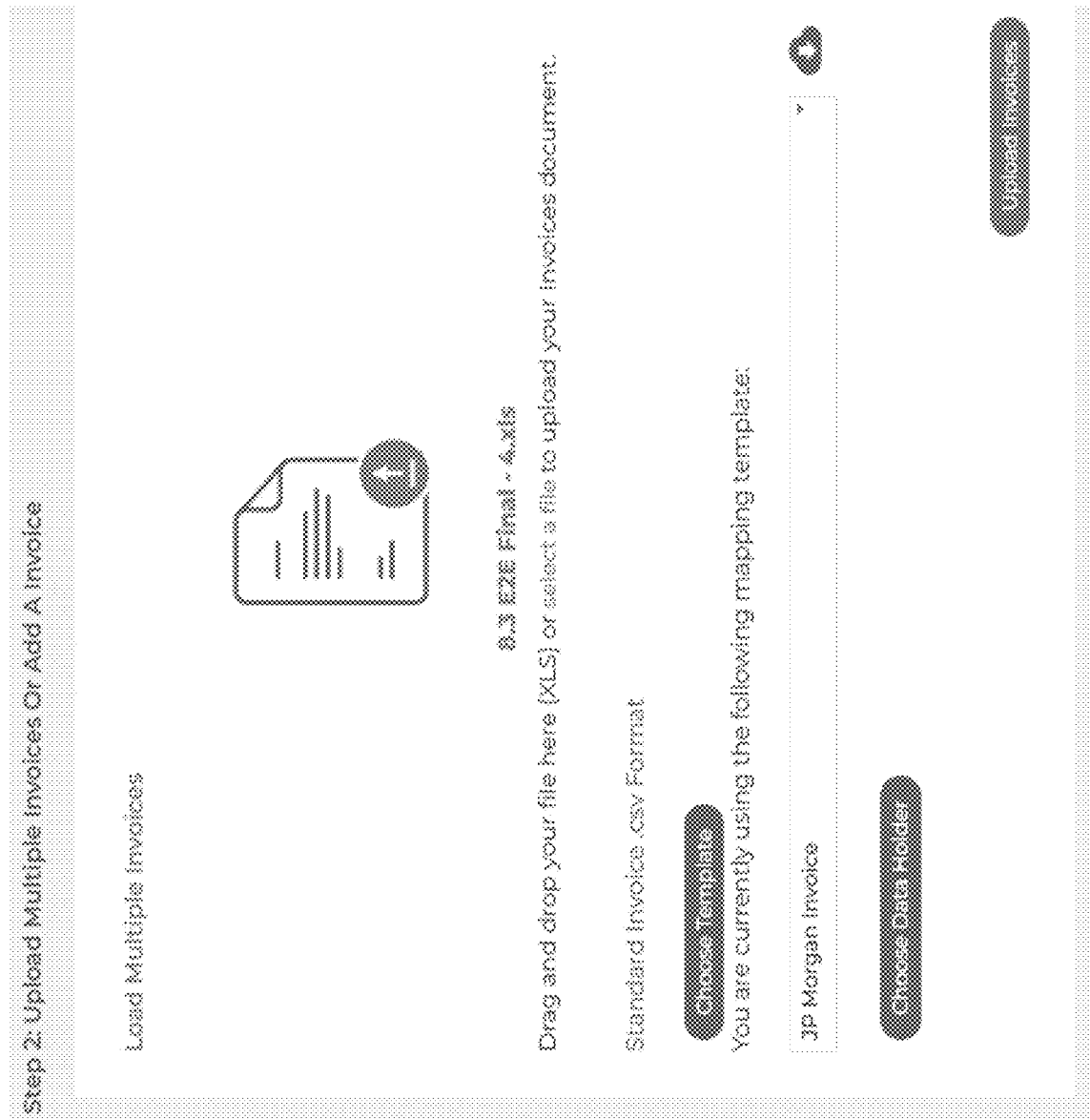

As shown in FIG. 9, the dynamic mapping configurator 150 may display an interface for selecting mapping templates 115 with which the multi-stage convolutional neural network 110 may analyze the ingest input 102. The dynamic mapping configurator 150 may display a request to select the mapping template 115. The dynamic mapping configurator 150 may receive a selection of the mapping template 115. The dynamic mapping configurator 150 may display the selected mapping template 115. The dynamic mapping configurator 150 may receive the selection for the multi-stage convolutional neural network 110 to analyze or parse the ingest input 102. The dynamic mapping configurator 150 may receive the selection during the parsing either manually or automatically.

The dynamic mapping configurator 150 may maintain the selected mapping templates 115 for the multi-stage convolutional neural network 110 to analyze the ingest input 102. For example, as shown in FIG. 3, the dynamic mapping configurator 150 may provide or transmit the mapping templates 115 as an input of an ingestion pipeline (e.g., multi-stage convolutional neural network 110). The ingestion pipeline may include a parser, a mapper, and/or the validator (e.g., multi-stage convolutional neural network 110 and/or the dynamic mapping configurator 150). The ingestion pipeline may be responsible for data extraction, mapping, normalization, and/or validation. The dynamic mapping configurator 150 may control the ingestion pipeline. For example, each step in this process may be triggered automatically.

The digital asset generation platform 100 may include an asset master (e.g., data store). The asset master may be a centralized repository that stores digitized asset data (e.g., digital asset 160) generated by the digital asset generation platform 100. For example, the asset master may store a master copy and/or backup copy of the digital asset 160 for retrieval by the digital asset generation platform 100 to display the digital asset 160 in an interface or to transmit the digital asset 160 to another system. The digital asset generation platform 100 may store digitized asset data in the asset master. The digital asset generation platform 100 may include a workflow database. The workflow database may include modules to engage in subsequent workflows. The dynamic mapping configurator may send the asset data from the asset master to the workflow database.

Figure 10:
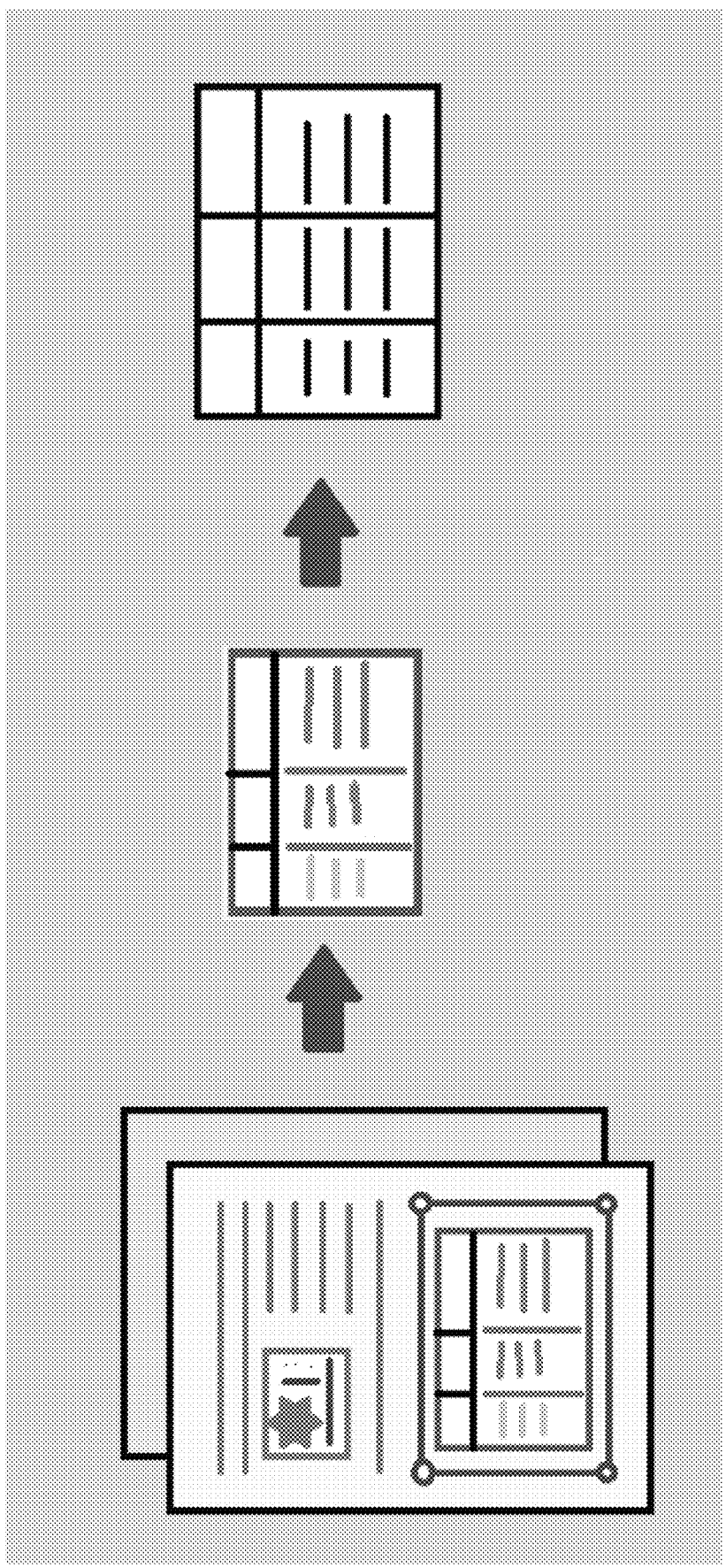
Figure 11:
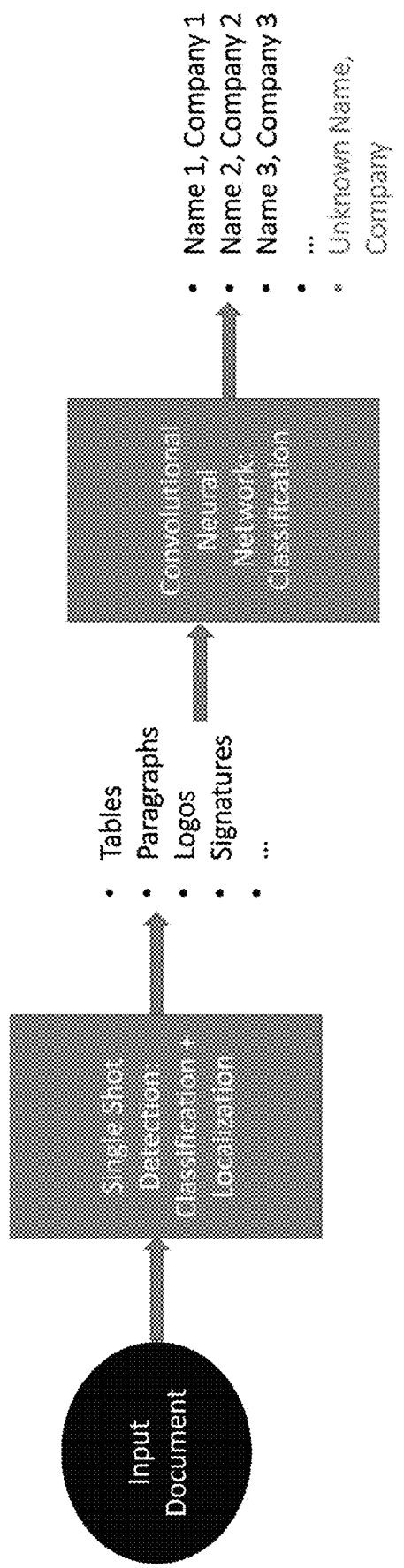

The multi-stage convolutional neural network 110 may include an object detector engine 114, which may correspond to a second stage of the multi-stage convolutional neural network 110. In some embodiments, the multi-stage convolutional neural network 110 may utilize the object detector engine 114 for detecting, classifying, and/or localizing elements in the at least one digital file 104. For example, as shown in FIG. 10, the object detector engine 114 may detect regions in the document 108 based on its document type for classification and/or localization. In another example, as shown in FIG. 11, the object detector engine 114 may classify and/or localize tables, paragraphs, logos, and signatures. In yet another example, object detector engine 114 may classify and/or localize signatures, logos, paragraphs, tables, boxes, QR codes, stamps, graphics, and/or companies.

Figure 12:
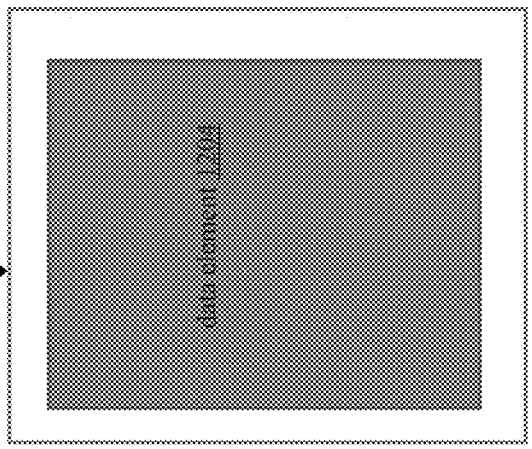

The object detector engine 114 may localize data elements into one or more fiducial markings (e.g., bounding boxes enclosing the raw OCR output). For example, as shown in FIG. 12, the one or more fiducial markings 1202 may be localized bounding boxes that are overlaid over data elements 1204, which may be regions in the document. In some embodiments, the fiducial markings may be bounding boxes overlaid on regions in the digital file 104 corresponding to the one or more documents 108. In another example, the fiducial markings may be bounding boxes and the data elements may be regions in the document. In some embodiments, the one or more fiducial markings may include or encompass values such as payment number, invoice number, invoice date, currency, invoice amount, and/or amount paid. In some embodiments, the one or more fiducial markings may include tables, signatures, logos, QR, stamps, and/or graphics.

The object detector engine 114 may capture the data elements in the one or more documents 108 by generating the one or more fiducial markings. The object detector engine 114 may generate the fiducial markings to enclose the data elements. In some embodiments, the object detector engine 114 may iteratively generate one or more fiducial markings overlaid on one or more data elements in the at least one digital file 104 based at least in part on the at least one data object model corresponding to the document type of the document 108. In some embodiments, the object detector engine 114 may receive from the dynamic mapping configurator 150, mapping templates 115 corresponding to the at least one data object model. The object detector engine 114 may generate the fiducial markings based on the mapping templates 115 corresponding to the at least one data object model. In some embodiments, the object detector engine 114 may generate the fiducial markings in which to detect the dynamic mapping.

In some embodiments, the object detector engine 114 may identify, for each of the one or more fiducial markings, a spatial correlation between a respective fiducial marking of the one or more fiducial markings and a respective data element of the one or more data elements. For example, the spatial correlation may represent an association between the data element and the fiducial marking. In another example, the spatial correlation indicates the extent to which the fiducial marking (e.g., bounding box) encloses the data elements (e.g., document object). In some embodiments, the object detector engine 114 may identity the spatial correlation based at least in part on the at least one data object model corresponding to the document type of the document 108. In some embodiments, the object detector engine 114 may receive from the dynamic mapping configurator 150, mapping templates 115 corresponding to the at least one data object model. The object detector engine 114 may identify the spatial correlation based on the mapping templates 115 corresponding to the at least one data object model.

In some embodiments, the object detector engine 114 may detect, for each respective fiducial marking of the one or more fiducial markings associated with a respective spatial correlation meeting or exceeding a loss metric criterion, a dynamic mapping between the respective fiducial marking and the respective data element of the one or more data elements. For example, the loss metric criterion may define a predetermined spatial correlation at which the fiducial marking (e.g., bounding box) is expected to enclose the data element (e.g., document object). The dynamic mapping may identify objects such as tables, paragraphs, logos, or signatures. In some embodiments, the object detector engine 114 may provide or transmit the dynamic mapping to the signature identity recognition engine 116. In some embodiments, the object detector engine 114 may provide or transmit the dynamic mapping to the post-processing engine 130.

In some embodiments, the object detector engine 114 may utilize the loss metric criterion based at least in part on the at least one data object model corresponding to the document type of the document 108. In some embodiments, the object detector engine 114 may receive from the dynamic mapping configurator 150, mapping templates 115 corresponding to the at least one data object model. The object detector engine 114 may utilize the loss metric criterion based on the mapping templates 115 corresponding to the at least one data object model. In some embodiments, the object detector engine 114 may generate the dynamic mapping based at least in part on the at least one data object model corresponding to the document type of the document 108. In some embodiments, the object detector engine 114 may receive from the dynamic mapping configurator 150, mapping templates 115 corresponding to the at least one data object model. The object detector engine 114 may generate the dynamic mapping based on the mapping templates 115 corresponding to the at least one data object model.

Figure 13:
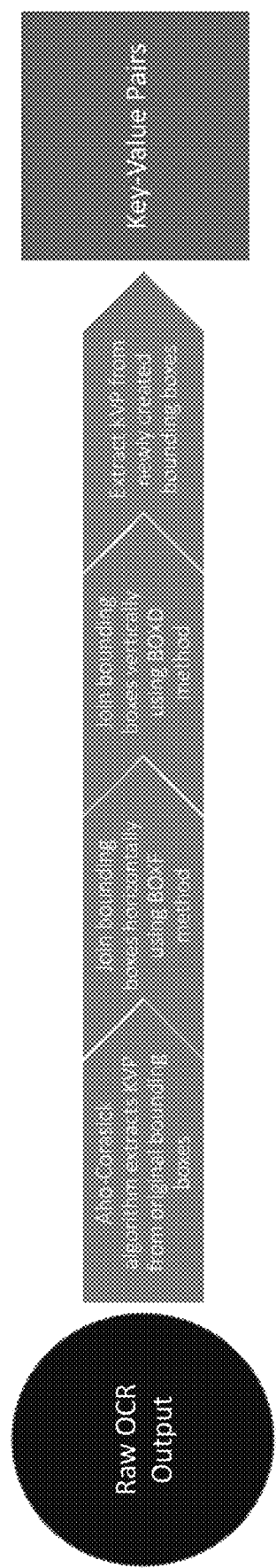

The object detector engine 114 may modify the one or more fiducial markings. In some embodiments, the object detector engine 114 may modify the one or more fiducial markings by combining or augmenting the one or more fiducial markings. For example, as shown in FIG. 13, the object detector engine 114 may join bounding boxes (e.g., fiducial markings) by combining or extending the bounding boxes (e.g., fiducial markings).

In some embodiments, the object detector engine 114 may modify the one or more fiducial markings based on the spatial correlation. In some embodiments, the object detector engine 114 may modify the one or more fiducial markings based on the spatial correlation not meeting or exceeding a loss metric criterion. For example, the object detector engine 114 may augment fiducial markings based on one or more fiducial markings not independently encompassing a respective element. In some embodiments, if the fiducial markings do not contain both key names and their respective values (e.g., two pieces of information to identify and/or extract the key value data pairs 140), then the distance search (e.g., search for adjacent or similar elements to identify and/or extract the key value data pairs 140) may be found to be inconsistent. In some embodiments, the fiducial markings might not extend to be multiple lines and values that appear under keys might not be combined by the object detector engine 114.

The object detector engine 114 may join or modify the fiducial markings along a horizontal axis. In some embodiments, the horizontally extended fiducial marking may include the one or more key value data pairs 140 on the same line joined together in the same fiducial marking. In some embodiments, the object detector engine 114 may generate vertically extended fiducial markings to encompass key value data pairs 140 that are horizontally aligned in the same bounding box. In some embodiments, the object detector engine 114 may generate trapezoidal visual fiducial markings to include key value data pairs 140 such as lines of text. The object detector engine 114 may automatically extract the one or more key value data pairs 140 from the modified (e.g., augmented) and/or generated (e.g., newly created) fiducial markings.

In some embodiments, the object detector engine 114 may automatically determine the loss metric criterion. In some embodiments, the object detector engine 114 may automatically determine the loss metric criterion based on the modified fiducial markings. For example, to analyze elements having new styles or new languages, the object detector engine 114 may monitor performance against new documents 108 with the new style. When the detection of the one or more data elements fails to satisfy the loss metric criterion, the object detector engine 114 may generate a modified loss metric criterion for the new style.

In some embodiments, the object detector engine 114 comprises an asymmetric loss function that maintains the loss metric criterion. In some embodiments, the object detector engine 114 may use the asymmetric loss function to verify that the fiducial marking (e.g., bounding box) encloses the data elements (e.g., document object). In some embodiments, the asymmetric loss function maintains the loss metric criterion for scale invariance, which can be the that the similarity between two arbitrary shapes A and B (e.g., fiducial marking and the element) is independent of the scale of their space S. In some embodiments, the asymmetric loss function maintains the loss metric criterion for fiducial markings, which defines the asymmetric metric is bounded by intersection over union (IoU). In some embodiments, the asymmetric loss function maintains the loss metric criterion that a distance, such as LIoAU=1−IoAU (Adaptive Intersection over Union), maintains the non-negativity properties of a metric. In some embodiments, the asymmetric loss function maintains the loss metric criterion as a triangle inequality, which can be L (A, B)<L (A, B)+L (B, C). In some embodiments, the asymmetric loss function maintains the loss metric criterion that is an identity of indiscernible, such as if L(A,B)=0, then A and B are indiscernible. In some embodiments, the aforementioned five conditions are required for the loss metric criterion. However, the loss metric criterion is not required to be symmetric for object detection and segmentation. In some embodiments, the asymmetric loss function maintains the loss metric criterion that is not symmetric, e.g., such that L(A,B) is not equal to L(B,A).

The object detector engine 114 may utilize the asymmetric loss function to enable a more accurate and precise localization of elements, such as tables. The asymmetric loss function may utilize the loss metric criterion to ensure that the fiducial marking (e.g., bounding box) encloses the entire element, such as a table, by applying greater penalty to an undersized fiducial marking (e.g., not fully surrounding an element) than to an oversized fiducial marking (e.g., surrounding greater than the element).

For example, A can be a ground truth and B can be the prediction. If IoU=B/A, GIoU=B/A, then Antisymmetric IoU=B/(A+Penalty). The object detector engine 114 may apply a penalty when the prediction BB is not preserving the entire object (ground truth). For example, based on the penalty, IoU=A/B, GIoU=A/B, and Antisymmetric IoU=A/B. In another example, based on the loss metric criterion, the asymmetric loss function may penalize the fiducial marking if it does not enclose the data element (e.g., slightly bigger than the data element). The asymmetric loss function may use the loss metric criterion to ensure that the data element is captured in the fiducial marking. For example, based on the loss metric criterion, the asymmetric loss function may ensure that the entire data element is captured in the fiducial marking for analysis. In another example, the loss metric criterion may be for the one or more fiducial markings to be non-negative and bounded. Thus, the asymmetric loss function may be optimized to enable the object detector engine 114 to surround an element more quickly and efficiently by employing less emphasis on fitting the fiducial marking precisely to the size of the element and instead weighting more heavily for fully enclosing the fiducial marking by the bounding box.

Figure 14A:
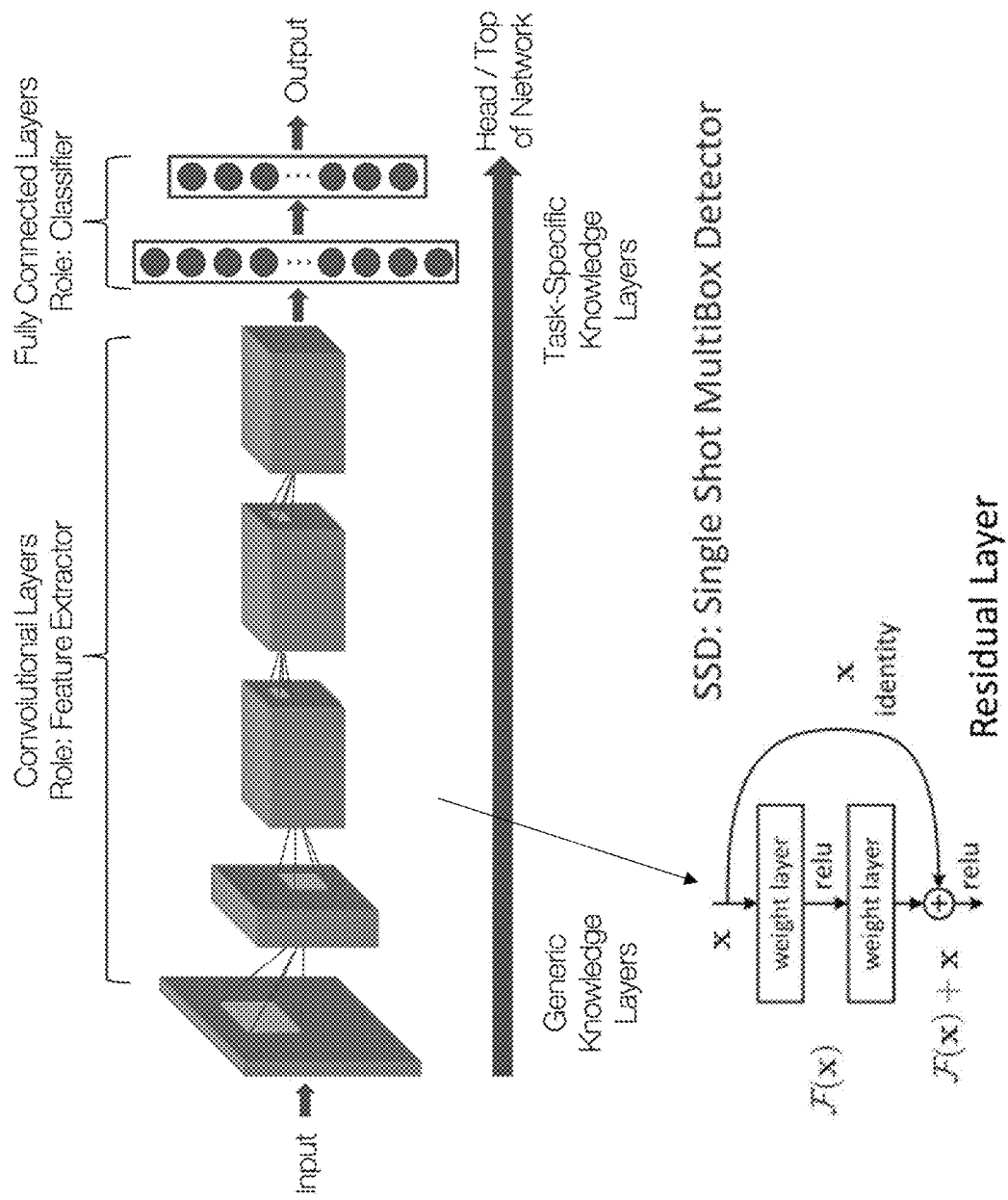

The object detector engine 114 may classify and localize the data elements in the one or more documents 108. In some embodiments, as shown in FIG. 14A, the object detector engine 114 may include one or more convolutional layers for classification and localization of the elements. The layers may be knowledge layers and/or task-specific knowledge layers. The layers may include a single shot multi-box detector with a residual layer.

Figure 14B:
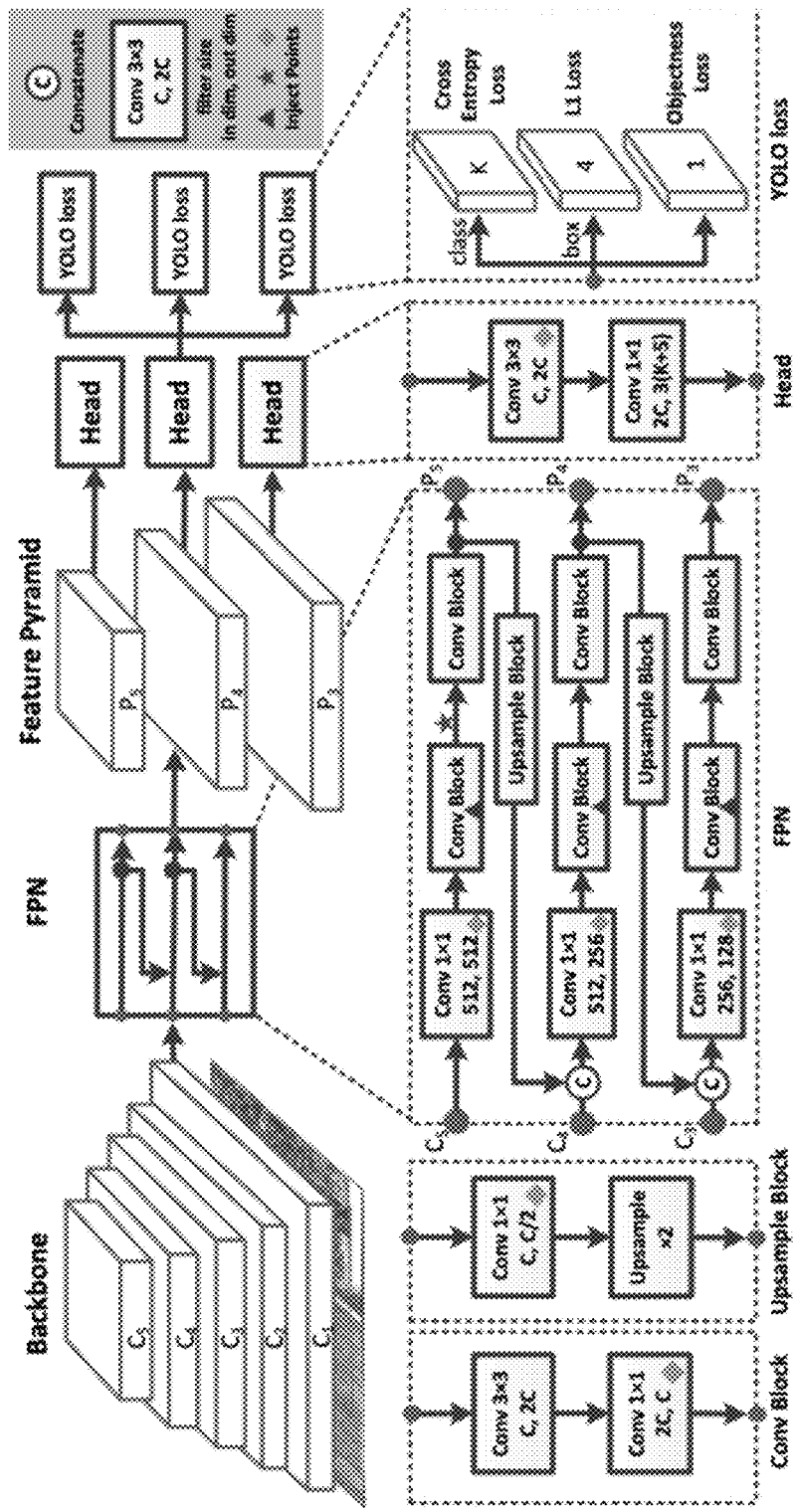

In some embodiments, as shown in FIG. 14B, the object detector engine 114 may include a backbone with a convolution block and up-sample block. The head (e.g., top of the convolution network) may provide or transmit output to a feature extractor or object detector with one or more convolution and up-sample blocks. The feature extractor or object detector may provide or transmit output to a feature pyramid. The feature pyramid may provide or transmit output to one or more heads, which may include convolution blocks. The heads may provide or transmit output to the asymmetric loss function, which may include cross entropy loss, L1 loss, and objectless loss. The object detector engine 114 may include a concatenate block with a convolution filter based on filter size in dim and out dim with inject points.

Figure 19:
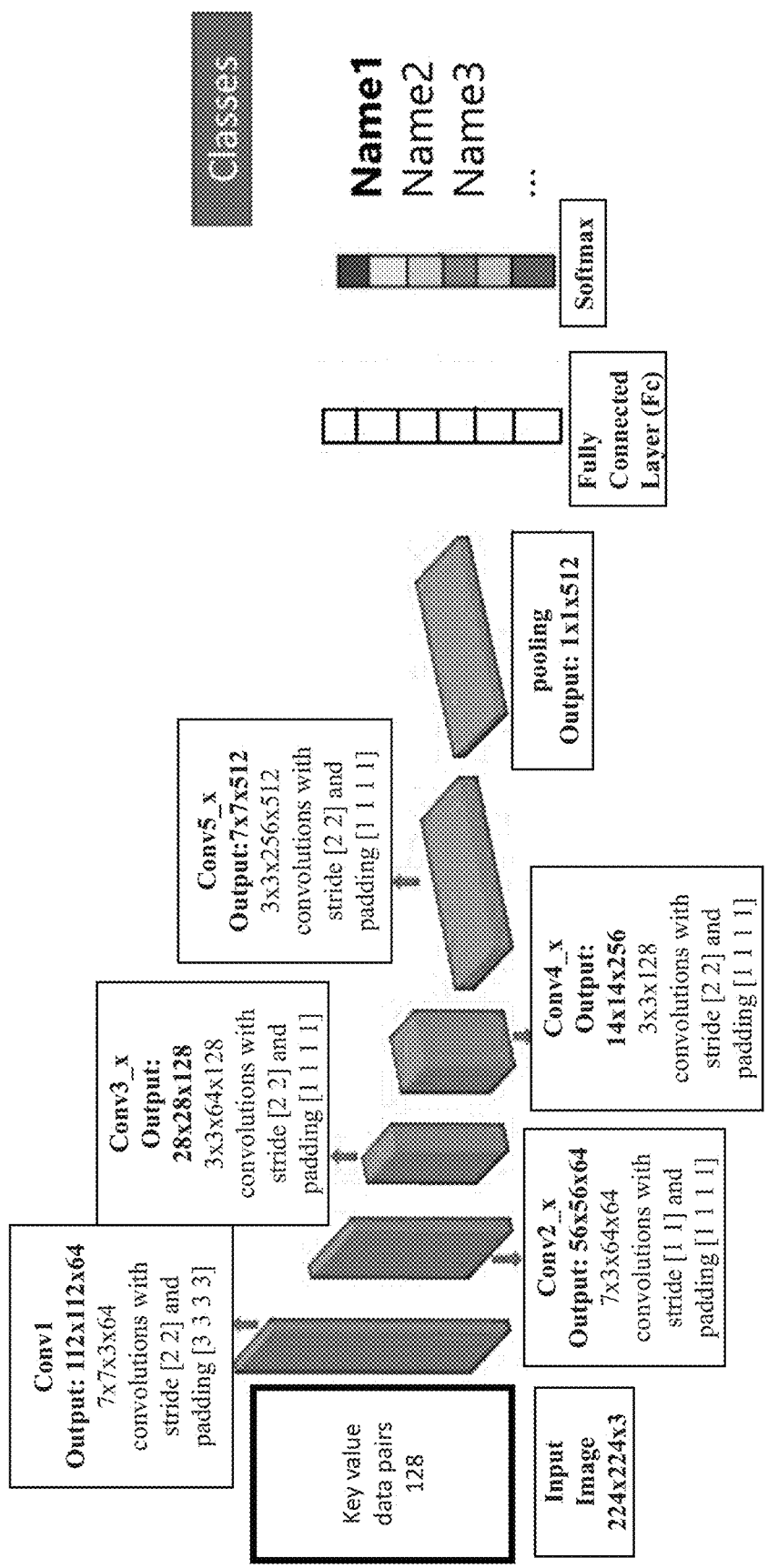
Figure 20:
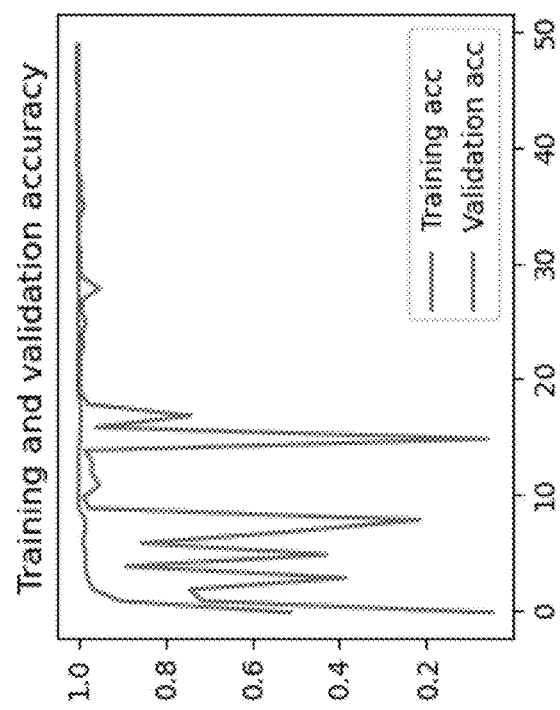
Figure 21:
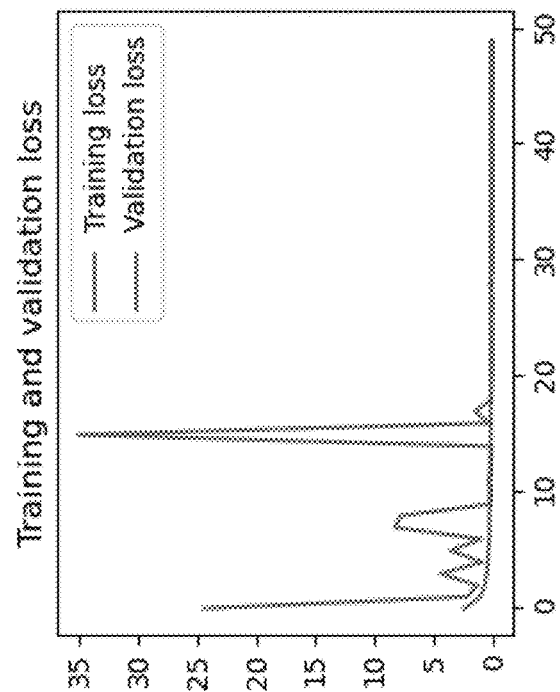

The multi-stage convolutional neural network 110 may include a signature identity recognition engine 116, which may correspond to a third stage of the multi-stage convolutional neural network 110. In some embodiments, the signature identity recognition engine 116 may receive the dynamic mapping from the object detector engine 114. The signature identity recognition engine 116 can be used for identifying one or more digital objects (e.g., signatures and/or logos) in the dynamic mapping in the at least one digital file. In some embodiments, the signature identity recognition engine 116 may extract the one or more digital objects from the dynamic mapping between the respective fiducial marking and the respective data element of the one or more data elements. The signature identity recognition engine 116 may include one or more serial convolution layers for processing the key value data pairs 140. For example, the signature identity recognition engine 116 may be trained for signature identification that may be utilized in identifying or validating signatures for smart contracts. In some embodiments, as shown in FIG. 19, the signature identity recognition engine 116 may include a CNN. In some embodiments, as shown in FIG. 19, the signature identity recognition engine 116 may include one or more layers to analyze the signatures. The signature identity recognition engine 116 may transform the one or more digital objects from original to change background to parallel light with angle to spotlight to cropping to rotation. As shown in FIG. 20, the signature identity recognition engine 116 may maintain training and validation accuracy. As shown in FIG. 21, the signature identity recognition engine 116 may identify training and validation loss in the one or more digital objects. In some embodiments, the signature identity recognition engine 116 may provide or transmit the one or more digital objects to the mapping configurator 150.

The digital asset generation platform 100 may include an object identifier engine 120. In some embodiments, the digital asset generation platform 100 may utilize the object identifier engine 120 for identifying one or more text objects. In some embodiments, as shown in FIG. 1A, in a series configuration, the digital asset generation platform 100 may utilize the object identifier engine 120 for identifying one or more text objects in the dynamic mapping generated by the object detector engine 114. In the series configuration, the digital asset generation platform 100 may utilize the object identifier engine 120 to identify the one or more text objects after the object detector engine 114 generates the dynamic mapping. The post-processing engine 130 may receive the dynamic mapping from the object detector engine 114, and then the post-processing engine 130 may wait to receive the one or more text objects since the one or more text objects will be generated from the dynamic mapping.

In some embodiments, as shown in FIG. 1B, in a parallel configuration, the digital asset generation platform 100 may utilize the object identifier engine 120 for identifying one or more text objects in the digital representation 107 based on the data object models generated by the document identification engine 112. In the parallel configuration, the digital asset generation platform 100 may utilize the object identifier engine 120 in parallel (e.g., simultaneously) with the object detector engine 114 generating the dynamic mapping. The post-processing engine 130 may receive in parallel (e.g., simultaneously) the dynamic mapping from the object detector engine 114 and the one or more text objects from the document identification engine 112.

In some embodiments, the object identifier engine 120 may extract one or more text objects from the dynamic mapping. In some embodiments, the object identifier engine 120 includes a natural language processing model (e.g., OCR text detection) to extract one or more text objects from the dynamic mapping. For example, the natural language processing model may identify text in languages such as English, Chinese, Arabic, German, French, and/or Spanish. In some embodiments, the object identifier engine 120 may query an OCR cloud service. The OCR cloud service may include a parser. The object identifier engine 120 may use the natural language processing model to digitize the one or more digital files 104. In some embodiments, the natural language processing model may be trained from less than 40 image documents.

In some embodiments, the post-processing engine 130 for generating the key value data pairs 140 may include at least one of an entity relationship mapping engine 134, an NLP engine 136, or a legal entity recognition engine 138. In some embodiments, the post-processing engine 130 may receive the dynamic mapping from the object detector engine 114. For example, the post-processing engine 130 may analyze or classify the dynamic mapping. In some embodiments, the post-processing engine 130 may receive the one or more text objects from the object identifier engine 120. For example, the post-processing engine 130 may analyze or classify the one or more text objects.

In some embodiments, the post-processing engine 130 may extract or identify one or more key value data pairs 140. In some embodiments, the post-processing engine 130 may extract or identify one or more key value data pairs 140 from the dynamic mapping between the respective fiducial marking and the respective data element of the one or more data elements. In some embodiments, the post-processing engine 130 may automatically extract or identify one or more key value data pairs 140 from the dynamic mapping based on the data element of the one or more data elements and the at least one fiducial marking of the one or more data elements meeting or exceeding the spatial correlation. For example, as shown in FIG. 10, the key value data pairs 140 may be pairs of names and companies. In another example, as shown in FIG. 16, the one or more key value data pairs 140 may be that a document type is an insurance policy, a permitted limit due date is 15 days, and/or the no fee period is 60 days. In some embodiments, the object identifier engine 120 may generate an output of key value data pairs 140, which may include JSON, documents, and/or objects for smart contracts. In some embodiments, the post-processing engine 130 may provide or transmit the key value data pairs 140 to the mapping configurator 150 for analysis.

In some embodiments, the post-processing engine 130 may extract or identify the key value pairs 140 based at least in part on the at least one data object model corresponding to the document type of the document 108. In some embodiments, the post-processing engine 130 may receive from the dynamic mapping configurator 150, mapping templates 115 corresponding to the at least one data object model. The post-processing engine 130 may extract or identify the key value pairs 140 based on the mapping templates 115 corresponding to the at least one data object model. In some embodiments, the post-processing engine 130 may extract or identify one or more key value data pairs 140 from the dynamic mapping based on the one or more text objects generated by the object identifier engine 120. In some embodiments, the post-processing engine 130 may extract or identify one or more key value data pairs 140 based on the dynamic mapping and the one or more text objects.

The post-processing engine 130 may utilize the entity relationship mapping engine 134 for entity relationship mapping to identify the entity (e.g., company) associated with the key value data pairs 140. The entity relationship mapping engine 134 may include OCR. The post-processing engine 130 may utilize the entity relationship mapping engine 134 for entity relationship mapping by using natural language processing. In some embodiments, the post-processing engine 130 may utilize the entity relationship mapping engine 134 for Named Entity Recognition (NER-NLP) to extract or identify the one or more key value data pairs 140. In some embodiments, the post-processing engine 130 may utilize the entity relationship mapping engine 134 for Named Entity Recognition (NER-NLP) for Legal Sentiment Analysis. For example, the digital asset generation platform 100 may use Natural Language Processing (NLP) for Named Entity Recognition (NER-Transformers) of text to parse key value pairs 140 when only the value is presented (e.g., value only).

In some embodiments, the post-processing engine 130 may utilize an NLP engine 136 to identify or classify key value data pairs 140 that are similar to headers 117 and training values 119 of the mapping templates 115. The NLP engine 136 may utilize fuzzy matching for different types of matching, such as simple text matching, target value matching, and table-specific matching (e.g., outside scope of the key value data pairs 140). The training values 119 values may be target values, which may include payment number, invoice number, invoice date, currency, invoice amount, amount paid, and/or other target values based on the domain of the document or any combination thereof.

In some embodiments, the post-processing engine 130 may utilize a legal entity recognition engine 138. In some embodiments, the post-processing engine 130 may utilize the legal entity recognition engine 138 to identify and classify the names of legal organizations (e.g., law firms, financial firms, consulting firms, research firms, etc.) in the key value data pairs 140. For example, the post-processing engine 130 may utilize the legal entity recognition engine 138 to analyze the key value data pairs 140 to identify all the legal entities in the ingest input 102. To identify the legal entities, the post-processing engine 130 may utilize the legal entity recognition engine 138 to compare the key value data pairs 140 with a data store containing known legal entities.

In some embodiments, the mapping configurator 150 can be used for classifying the key value pairs 140. The dynamic mapping configurator 150 may utilize the mapping templates 115 to analyze the key value pairs 140. The dynamic mapping configurator 150 may apply the mapping templates 115 manually or automatically based on how incoming data is configured. In some embodiments, the dynamic mapping configurator 150 may apply the mapping templates 115 based on the input document 108, the data object model, and/or the key value data pairs 140. In some embodiments, the dynamic mapping configurator 150 may select the mapping templates 115 based on the data object model.

In some embodiments, the dynamic mapping configurator 150 may dynamically generate a digital asset 160 representative of the one or more documents 108 based on the one or more key value data pairs 140 extracted or identified from the dynamic mapping between each fiducial marking of the one or more fiducial markings and the respective data element of the one or more data elements. For example, the digital asset 160 may be a self-executing smart contract generated from the one or more documents 108 that include purchase orders, invoices, and/or policies.

Figure 15:
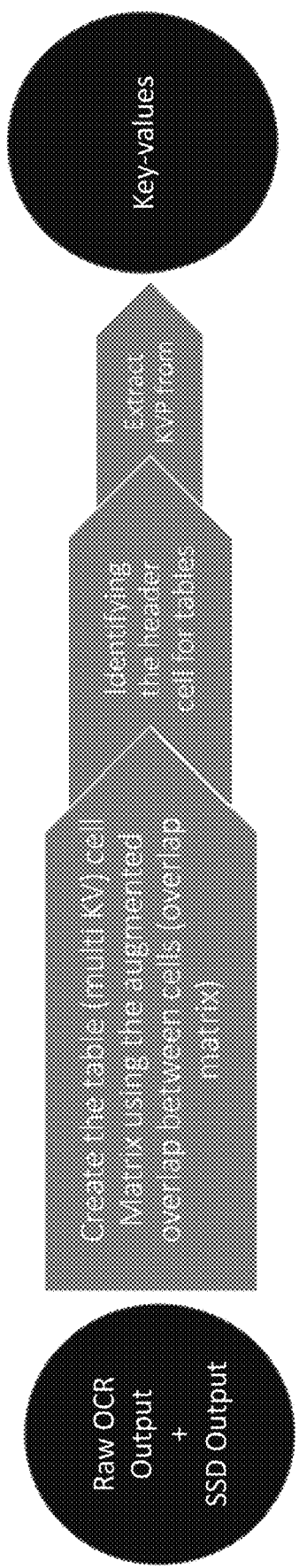

In some embodiments, the digital asset 160 may include a multi-cell matrix 162. In some embodiments, the multi-cell matrix 162 may include one or more headers 117 defined by the mapping templates 115. In some embodiments, the mapping templates 115 can correspond to the data object model. For example, as shown in FIG. 15, the mapping configurator 150 may generate a table cell with a value (e.g., multi key value). The mapping configurator 150 may generate the multi-cell matrix 162 using the augmented overlap (e.g., enlarged fiducial markings) between the cells (e.g., overlap matrix based on the dynamic mapping).

In some embodiments, the mapping configurator 150 may generate the digital asset 160 to include the multi-cell matrix 162 with one or more headers 117 to organize the key value data pairs 140. In some embodiments, to generate the digital asset 160, the mapping configurator 150 may generate, based on the one or more key value data pairs 140, the multi-cell matrix 162 with the at least one header 117 and the key value data pairs 140. In some embodiments, the mapping configurator 150 may generate the digital asset 160 comprising the one or more key value data pairs 140 in the multi-cell matrix 162 having the at least one header 117.

Figure 17:
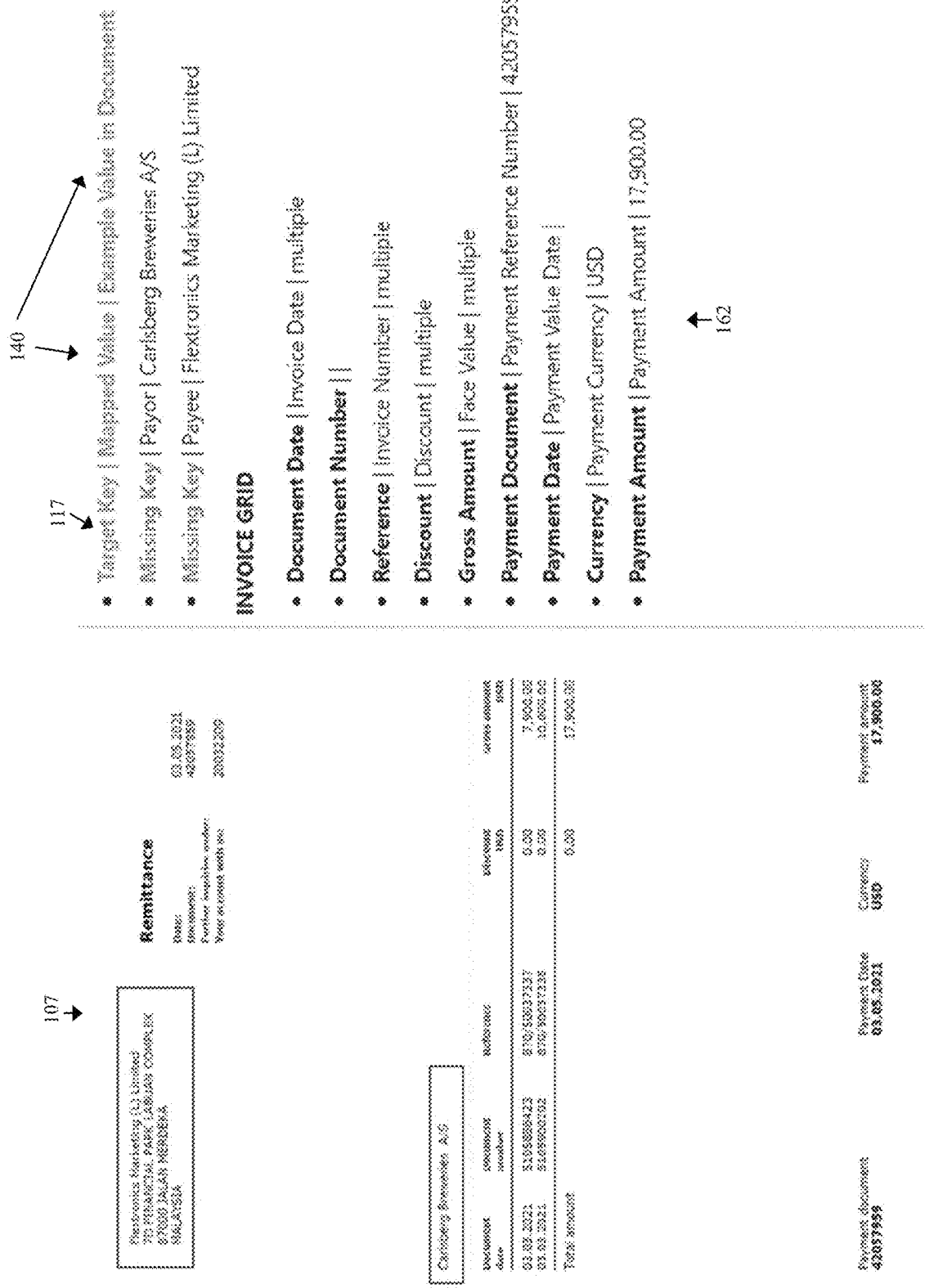

In some embodiments, to populate the key value data pairs 140 in the matrix 162 based on the headers 117, the mapping configurator 150 may identify a respective header 117 associated with respective key value data pairs 140. For example, as shown in FIG. 17, the mapping configurator 150 may identify one or more training values 119 of the mapping template 115. The dynamic mapping configurator 150 may insert each key value data pairs 140 based on its respective to header 117 to organize key value data pairs 140 in the matrix 162. In some embodiments, based on the key value data pairs 140 and the mapping templates 115, the mapping configurator 150 may identify the one or more headers 117 associated with the key value data pairs 140 to generate a table (e.g., matrix 162).

In some embodiments, the mapping configurator 150 may generate the digital asset 160 comprising the one or more key value data pairs by comparing the one or more training values 119 with the one or more key value data pairs 140. In some embodiments, the mapping configurator 150 may compare the key value data pairs 140 with the training values 119 of the templates 115 to identify the one or more headers 117. For example, if a particular key value data pairs are (currency, USD), then the mapping configurator 150 may identify headers for "Payment Currency" under which to insert the particular key value data pairs.

Figure 18:
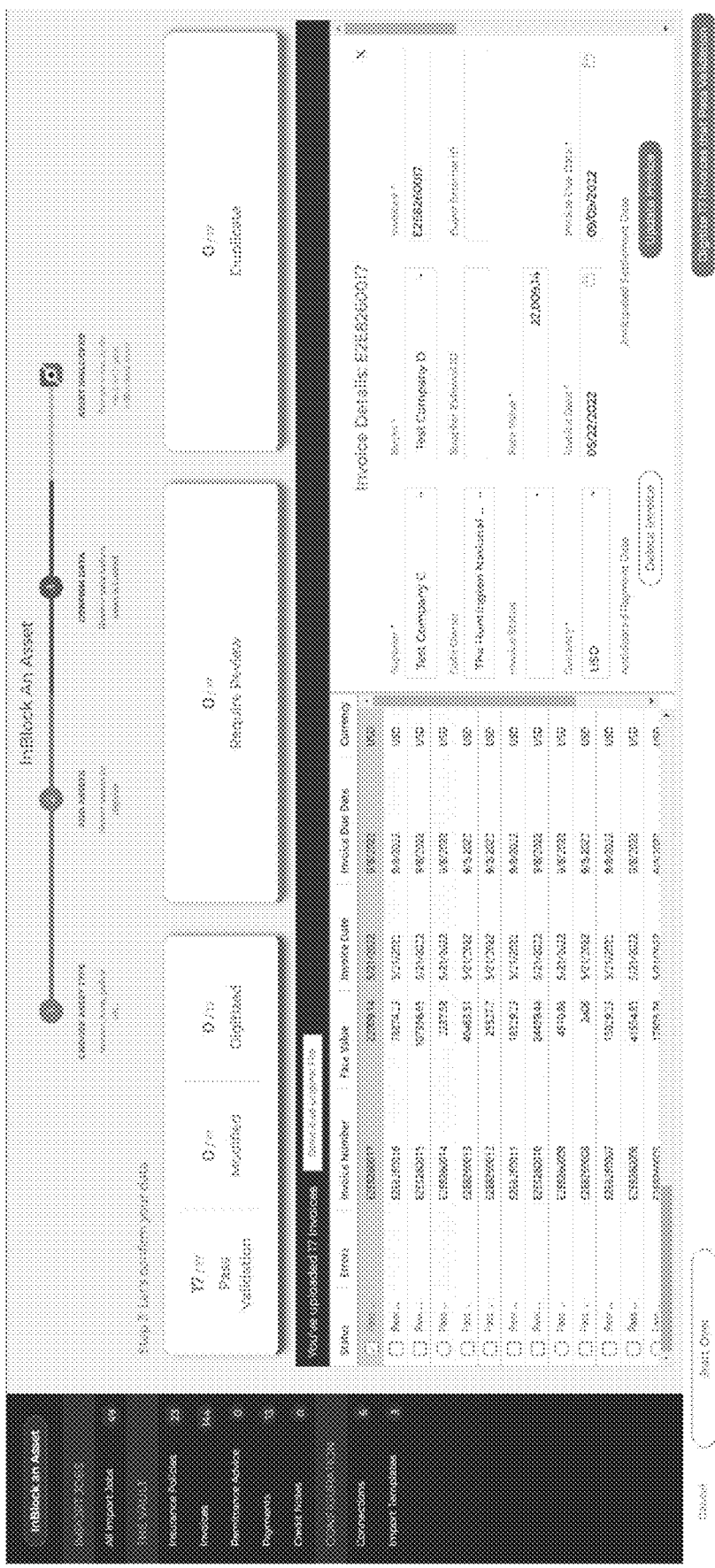

As shown in FIG. 18, the dynamic mapping configurator 150 may display an interface for displaying the digital asset 160 generated based on the mapping templates 115. The dynamic mapping configurator 150 may leverage the mapping templates 115 by applying the mapping templates 115 to the ingest input 102 to obtain parsed results (e.g., key value data pairs 140). The dynamic mapping configurator 150 may display the parsed results. The dynamic mapping configurator 150 may normalize the parsed results into normalized data. The dynamic mapping configurator 150 may validate the normalized data. The dynamic mapping configurator 150 may save the normalized and validated data. The dynamic mapping configurator 150 may display a selectable option to digitize the normalized and validated data to generate the digital asset 160.

As shown in FIG. 18, the dynamic mapping configurator 150 may receive one or more feedback inputs for the digital asset 160. In some embodiments, the dynamic mapping configurator 150 may receive one or more feedback inputs for the key value data pairs 140 in the matrix 162. In some embodiments, the digital asset generation platform 100 may utilize machine learning to train the multi-stage convolutional neural network 110 to impute or correct missing or mistaken information in the key value data pairs 140. For example, the train the multi-stage convolutional neural network 110 may be trained, and GPU/CPU optimized specifically for financial documents. In another example, when the digital asset generation platform 100 identifies a new language or characters, the digital asset generation platform 100 may validate the key value data pairs 140 to test the multi-stage convolutional neural network 110 against the new language and characters.

In some embodiments, the dynamic mapping configurator 150 may receive one or more feedback inputs to modify the associations between the key value data pairs 140 and the headers 117. In some embodiments, the digital asset generation platform 100 may automatically train the multi-stage convolutional neural network 110 responsive to identifying whether the one or more feedback inputs indicate that the at least one header 117 is associated with the one or more key value data pairs 140. For example, the digital asset generation platform 100 may train the multi-stage convolutional neural network 110 based on whether the headers 117 of the digital asset 160 are related to the extracted or identified key value data pairs 140. The digital asset generation platform 100 may validate the multi-stage convolutional neural network 110 if one or more feedback inputs indicate that the key value data pairs 140 are related to the headers 117.

In some embodiments, the digital asset generation platform 100 may automatically train the multi-stage convolutional neural network 110 to generate the digital asset 160 based on the one or more feedback inputs. In some embodiments, the digital asset generation platform 100 may train one or more stages of the multi-stage convolutional neural network 110 to generate the digital asset 160 based on the one or more feedback inputs. In some embodiments, the re-trained multi-stage convolutional neural network 110 may more accurately detect the dynamic mapping between the elements and the fiducial markings to create a more accurate digital asset 160. In some embodiments, the re-trained multi-stage convolutional neural network 110 may more accurately associate the key value data pairs 140 with the headers 117 to create a more accurate digital asset.

Figure 22:
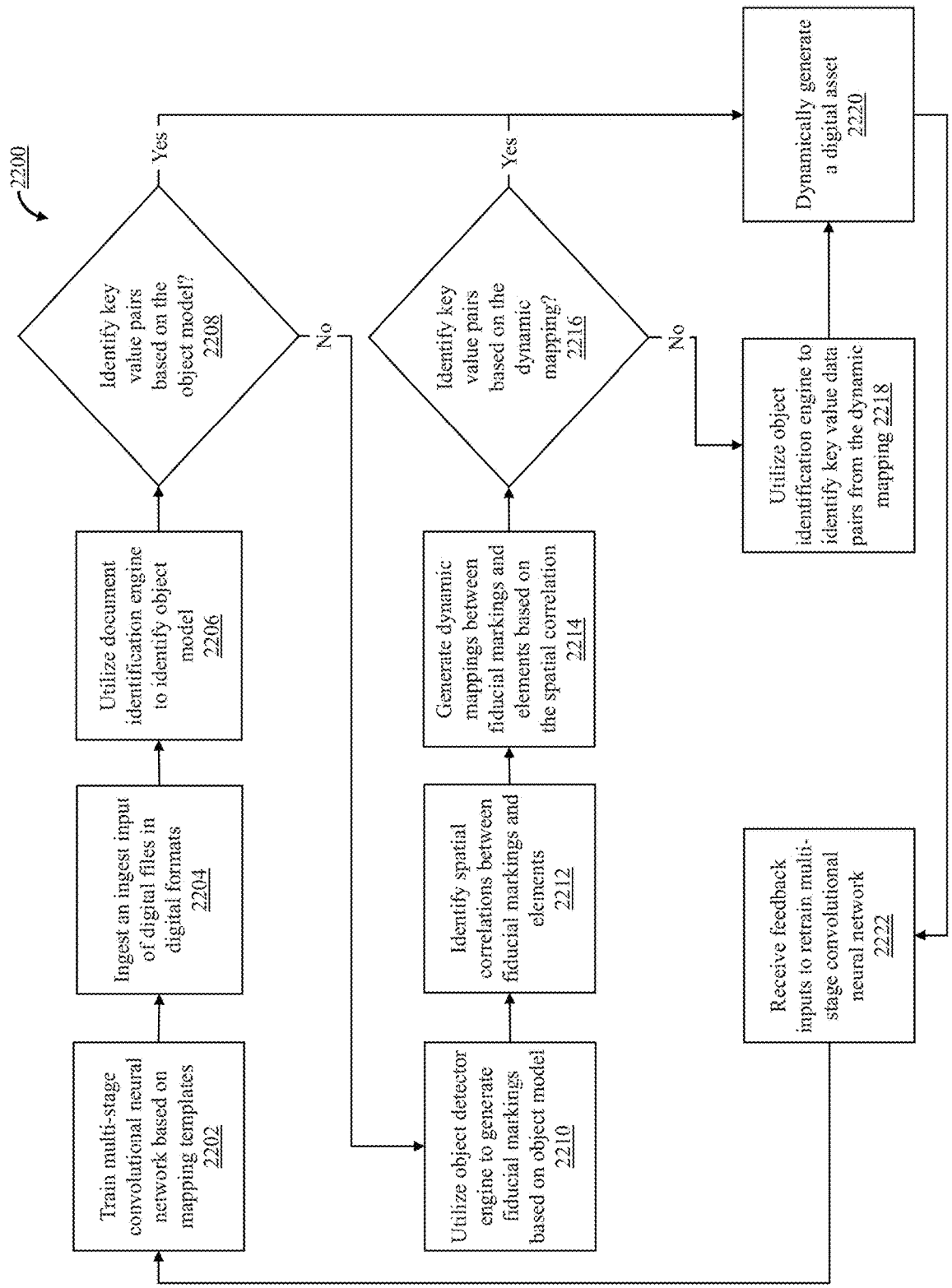

Now referring to FIG. 22, shown is a method 2200 for a digital asset generation platform for classifying data structures and/or generating digital assets. Any of the steps shown in method 2200 may be optional or performed in any order.

In STEP 2202, in some embodiments, the digital asset generation platform 100 may train the multi-stage convolutional neural network 110 based on the mapping templates 115 to analyze the ingest input 102. As shown in FIG. 3, the digital asset generation platform 100 may create mapping templates 115. In some embodiments, the digital asset generation platform 100 may utilize a dynamic mapping configurator 150 that maintains mapping templates 115 with which to analyze the one or more documents 108 received by the document identification engine 112. The mapping templates 115 may be representative of the one or more documents 108. The dynamic mapping configurator 150 may receive mapping templates 115 with which to analyze the one or more documents 108.

As shown in FIG. 3, the dynamic mapping configurator 150 define map values (e.g., headers 117) for the mapping template 115 to be used to analyze the ingest input 102. The dynamic mapping configurator 150 may manage map values that include a source of the document 108. For example, the source may include a loan reference expressed as a string, an issuance date expressed as a date/time, a maturity date expressed as date/time, a loan amount expressed as an integer, and/or a discount percent expressed as a percentage. The dynamic mapping configurator 150 may map values that include mapped values for the mapping template 115. For example, the mapped values may include an invoice number expressed as a string, invoice due date expressed as a date/time, a face value expressed as an integer, and/or a margin rate expressed as a percentage. The dynamic mapping configurator 150 may manage static values for the mapping template 115. For example, the static value may include a currency expressed as a code in the value expressed as dollars.

The dynamic mapping configurator 150 may associate each source value with a corresponding mapped value. For example, the dynamic mapping configurator 150 may associate the loan reference with the invoice number, the issuance date with the invoice date, the maturity date with the invoice due date, the loan amount with the face value, and/or the discount percent with the margin rate.

As shown in FIG. 4, the dynamic mapping configurator 150 may generate an interface to receive the mapping templates 115. The dynamic mapping configurator 150 may receive selections of document types associated with the mapping templates 115. For example, the document types may be asset types. In another example, the dynamic mapping configurator 150 may receive a selection that the asset type is an invoice. In some embodiments, the dynamic mapping configurator 150 may receive a selection for which companies are assigned to the mapping templates 115. For example, the document types may be a company associated with the ingest input 102.

The document types defined by the mapping templates 115 may correspond to the data object models identified by the document identification engine 112. In some embodiments, the document identification engine 112 may identify the data object models of the one or more documents 108 based on the document types defined by the one or more mapping templates 115. In some embodiments, the document identification engine 112 may compare the digital file 104 to the mapping templates 115 to identify the object model of the one or more documents 108 represented by the digital file 104. In some embodiments, the document identification engine 112 may select, from one or more mapping templates 115, a mapping template having a document type corresponding to the at least one data object model. The document identification engine 112 may utilize the mapped values of the selected mapping template to further analyze the ingest input 102.

As shown in FIG. 5, the dynamic mapping configurator 150 may generate an interface for receiving mapping templates 115. The dynamic mapping configurator 150 may receive, via the interface, the mapping templates 115 as a file. The dynamic mapping configurator may create or generate the mapping templates 115 based on the file that may be uploaded. The dynamic mapping configurator 150 may create the mapping templates 115 in various formats. For example, the mapping templates 115 may have a format of .CSV, .XLSX, .XLS, .XML, or .EDI.

In some embodiments, the digital asset generation platform 100 may train the multi-stage convolutional neural network 110 to capture the new language and characters. To assist with training, the digital asset generation platform 100 may receive mapping templates 115 that are annotated or labeled (e.g., not real-time). For example, mapping templates 115 may include elements with annotations such as signatures, logos, tables, stamps, and/or graphics. The object identifier engine 120 may up-sample data in the mapping templates 115. The object identifier engine 120 may use up sample data in the mapping templates 115 that include synthetic images. The digital asset generation platform 100 may up sample the annotated mapping templates 115 and then retrain the multi-stage convolutional neural network 110 depending on which the elements were not identified.

As shown in FIG. 6, the dynamic mapping configurator 150 may generate an interface for configuring headers 117 of the mapping templates 115. The headers 117 may be elements to search for in the ingest input 102, such as document date, document number, reference, discount, gross amount, payment document, payment date, currency, and payment amount. The dynamic mapping configurator 150 may display the headers 117 to be configured in the templates 115. For example, the dynamic mapping configurator 150 may search for the headers 117 in the digital file 104 to analyze the one or more documents 108. The dynamic mapping configurator 150 may receive, via the interface, configurations for the mapping template 115. The dynamic mapping configurator 150 may receive, via the interface, selections to configure and create the mapping templates 115. For example, the dynamic mapping configurator 150 may receive the selections from a user. The interface may include headers 117 that are selectable. The dynamic mapping configurator 150 may receive the selections of the headers 117. The dynamic mapping configurator 150 may receive selections of one or more the headers 117 to configure the templates 115.

As shown in FIG. 7, the dynamic mapping configurator 150 may generate an interface for associating headers 117 with training values 119 to configure the mapping templates 115. The dynamic mapping configurator may assign the training values 119 to known destination fields (e.g., headers 117) to train the dynamic mapping configurator 150 to normalize data during analysis of the ingest input 102. The dynamic mapping configurator 150 may assign formatting requirements to define the training values 119. For example, the dynamic mapping configurator 150 may assign the date fields to define formatting logic. In some embodiments, the dynamic mapping configurator 150 may receive, via the interface, regions of interest for the one or more documents 108. For example, the regions of interest may be areas of where to search for data in the one or more documents 108.

As shown in FIG. 8, the dynamic mapping configurator 150 may display an interface for defining the training values 119 (e.g., mapped fields) of the mapping templates 115. The dynamic mapping configurator 150 may display, in the interface, training values 119 for the documents. The dynamic mapping configurator 150 may preview the results of the mapping to ensure the associations between the headers 117 and the training values 119 are accurate. The dynamic mapping configurator 150 may receive verification inputs via the interface to verify the accuracy of associations between the headers 117 and the training values 119.

As shown in FIG. 9, the dynamic mapping configurator 150 may display an interface for selecting mapping templates 115 with which the multi-stage convolutional neural network 110 may analyze the ingest input 102. The dynamic mapping configurator 150 may display a request to select the mapping template 115. The dynamic mapping configurator 150 may receive a selection of the mapping template 115. The dynamic mapping configurator 150 may display the selected mapping template 115. The dynamic mapping configurator 150 may receive the selection for the multi-stage convolutional neural network 110 to analyze or parse the ingest input 102. The dynamic mapping configurator 150 may receive the selection during the parsing either manually or automatically.

The dynamic mapping configurator 150 may maintain the selected mapping templates 115 for the multi-stage convolutional neural network 110 to analyze the ingest input 102. For example, as shown in FIG. 3, the dynamic mapping configurator 150 may provide or transmit the mapping templates 115 as an input of an ingestion pipeline (e.g., multi-stage convolutional neural network 110). The ingestion pipeline may include a parser, a mapper, and/or the validator (e.g., multi-stage convolutional neural network 110 and/or the dynamic mapping configurator 150). The ingestion pipeline may be responsible for data extraction, mapping, normalization, and/or validation. The dynamic mapping configurator 150 may control the ingestion pipeline. For example, each step in this process may be triggered automatically.

The digital asset generation platform 100 may include an asset master (e.g., data store). The asset master may be a centralized repository that stores digitized asset data (e.g., digital asset 160) generated by the digital asset generation platform 100. For example, the asset master may store a master copy and/or backup copy of the digital asset 160 for retrieval by the digital asset generation platform 100 to display the digital asset 160 in an interface or to transmit the digital asset 160 to another system. The digital asset generation platform 100 may store digitized asset data in the asset master. The digital asset generation platform 100 may include a workflow database. The workflow database may include modules to engage in subsequent workflows. The dynamic mapping configurator may send the asset data from the asset master to the workflow database.

In STEP 2204, in some embodiments, the digital asset generation platform 100 may ingest an ingest input 102 that includes one or more digital files 104 in one or more digital formats 106. The ingest input 102 may be a data package to be analyzed by the digital asset generation platform 100.

The ingest input 102 may include one or more digital files 104. The one or more digital files 104 may be any electronic file that may be stored in and accessed from a variety of computer devices. The one or more digital files 104 may be in one or more digital formats 106. For example, the one or more digital formats 106 may be an image PNG, JPG, or PDF.

In some embodiments, the at least one digital file 104 having the one or more digital formats 106 may be capturing at least one digital representation 107 of the one or more documents 108. The at least one digital representation 107 may be produced by a pre-processing engine 109 that may apply document processing activities on the one or more documents 108, such as but not limited to scanning, printing, taking a snapshot. The pre-processing engine 109 may preprocess the one or more documents 108 into the digital representation 107. For example, preprocessing the one or more documents 108 may include converting a PDF to PNG, image normalization, image binarization, dots per inch conversion (DPI), and/or removing noise from the images.

In some embodiments, the one or more documents 108 may be an information package represented by text, images, and/or visible content that may be manipulated by the document processing software (e.g., word processing programs, imaging programs, and/or presentation programs). For example, the one or more documents 108 may be remittance advice, invoices, insurance policies, bill of lading, other financial or non-financial document, and/or any combination thereof.

In some embodiments, the digital asset platform 100 may include a multi-stage convolutional neural network 110 for classifying the at least one digital representation 107 of the one or more documents 108. In some embodiments, the multi-stage convolutional neural network 110 may include three stages. The first stage may be the document identification engine 112, the second stage may be the object detector engine 114, and the third stage may be the signature identity recognition engine 116.

In some embodiments, the multi-stage convolutional neural network 110 may analyze objects such as tables, paragraphs, logos, and signatures. The multi-stage convolutional neural network 110 may include fully connected layers as classifiers. In some embodiments, the fully connected layers may generate outputs at the head or top of the network. In some embodiments, the multi-stage convolutional neural network 110 may include one or more layers. For example, the depth of the neural network may be 3 or 4. In some embodiments, other depths may be used, such as, e.g., 2, 3, 4, 5, 6, 7, 8, 9, 10 or more. In some embodiments, the multi-stage convolutional neural network 110 may include an input, a kernel, and a feature map. In some embodiments, the multi-stage convolutional neural network 110 may include a neural network with a convolutional operation instead of matrix multiplication at least one of the layers. In some embodiments, the multi-stage convolutional neural network 110 may include a locally connected layer, a convolutional layer, and a fully connected layer.

In some embodiments, the multi-stage convolutional neural network 110 may include, utilize, and/or be a cloud-based AI Computer Vision (CV), Computer Vision (CV), AI, Deep Learning (DL), Web Applications, Live video stream, and/or Live Analysis by CV. In some embodiments, the multi-stage convolutional neural network 110 may be configured to utilize one or more exemplary AI/computer vision techniques chosen from, but not limited to, decision trees, graph algorithm, boosting, support-vector machines, neural networks, nearest neighbor algorithms, Naive Bayes, bagging, random forests. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly received input data,
vi) optionally and in parallel, continue to train the exemplary trained model with a predetermined periodicity.

In some embodiments and, optionally, in combination of any embodiment described above or below, the exemplary trained multi-stage convolutional neural network 110 may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained deep learning model may also be specified to include other parameters, including but not limited to, bias values/functions and/or aggregation functions. For example, an activation function of a node may be a step function, sine function, continuous or piecewise linear function, sigmoid function, hyperbolic tangent function, rectified linear activation function or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In STEP 2206, in some embodiments, the digital asset generation platform 100 may utilize the document identification engine 112 to identify the one or more object models. The multi-stage convolutional neural network 110 may include a document identification engine 112. In some embodiments, the document identification engine 112 corresponds to the first stage of the multi-stage convolutional neural network 110. In some embodiments, the document identification engine 112 may receive the ingest input 102 from the multi-stage convolutional neural network 110. In some embodiments, the document identification engine 112 may identify the type of the one or more documents 108. For example, the document identification engine 112 may classify that one or more documents 108 is an invoice, agreement, BOLs, credit notes, PO, RA, and/or policy.

In some embodiments, the document identification engine 112 may identify at least one data object model of one or more data object models for the one or more documents 108. In some embodiments, as shown in FIG. 2, the document identification engine 112 may include a CNN with one or more layers for identifying the data object models from the digital file 104. The data object models may correspond to document types of the one or more documents 108 where each data object model corresponds to a particular document type. For example, the document type may be an invoice or an insurance policy. The one or more data object models may indicate the subject matter included in the one or more document 108, such as invoice, agreement, BOLs, credit notes, purchase order (PO), remittance advice (RA), policy, insurance policies, BOLs, and Master of Service agreements. An unknown class may refer to the class of inputs that don't have the criteria such as resolution, quality, and context for being a valid document (e.g., garbage identifier).

In some embodiments, the document identification engine 112 identifies one or more data elements to identify the data object model. For example, the one or more data elements may be a table in the one or more documents 108. In another example, the one or more data elements may be objects such as fields, logo, signature, QR, stamps, and/or graphics. In another example, the one or more data elements may be raw OCR output. In some embodiments, the document identification engine 112 may automatically detect one or more data elements from the at least one digital file 104 of the ingest input 102. For example, the document identification engine 112 may identify the location of elements in the digital file 104. The document identification engine 112 may use transform the digital file 104 to identify the elements. For example, the document identification engine 112 may transform the digital file with rotation, cropping and change of brightness. The document identification engine 112 may use a generation adversarial network that includes a deep transformer network to detect the one or more data elements.

In some embodiments, the document identification engine 112 may identify the object model based on the location of elements in the digital file 104. In some embodiments, the document identification engine 112 may identify the object model based on the location of where the elements load. In some embodiments, the document identification engine 112 may identify the type of the documents 108 based on the source of the ingest input 102. For example, the document identification engine 112 may identify the type of the documents 108 based whether the ingest input 102 was received via a user interface upload or via an SFTP connection. For each model, the document identification engine 112 may identify one or more digital formats 106 of the digital file 104. For example, for each asset type, there may be several different accepted document formats. In some embodiments, the document identification engine 112 may determine the digital format 106 of the documents 108. For example, the document identification engine 112 may determine the incoming document format by identifier for file formats (e.g., media type (MIME-type)).

In some embodiments, the document identification engine 112 may identify the data object models by utilizing a dynamic mapping configurator 150 that maintains mapping templates 115. In some embodiments, upon determining the object model and the digital format 106, the document identification engine 112 can retrieve a corresponding mapping template 115 from the mapping configurator 150. The multi-stage convolutional neural network 110 may provide or transmit the mapping template 115 to the multi-stage convolutional neural network 110 for analysis of the elements. For example, once asset-type and document MIME-type are determined, the multi-stage convolutional neural network 110 can use the mapping templates 115 for data extraction and downstream processing.

In some embodiments, the document identification engine 112 can identify that the one or more data elements of the at least one digital file 104 are associated at least one data object model of one or more data object models. In some embodiments, the document identification engine 112 identifies the data object model based on the one or more data elements. For example, if the elements include a logo associated with insurance, then the document identification engine 112 may identify the data object model corresponding to the document type that is an insurance policy. In some embodiments, the document identification engine 112 may classify the one or more data elements based on the data object model. For example, if the document type is an invoice, the document identification engine 112 may classify the one or more data elements that have price as relevant document assets, and the one or more data elements that have a coupon as non-document assets. In another example, if the document type is an insurance policy, the models may document identification engine 112 may classify the one or more data elements as one or more declaration pages.

In STEP 2208, some embodiments, the digital asset generation platform 100 may attempt to generate or extract the key value pairs 140 from the ingest input 102 based on the one or more object models. In some embodiments, the digital asset generation platform 100 may extract or identify the one or more key value data pairs 140 from the data elements based on the one or more data object models. For example, the digital asset generation platform 100 may use the one or more data object models to generate the key value data pairs 140, which may include JSON, documents, and/or objects for smart contracts. If the digital asset generation platform 100 identifies the key value data pairs 140, the method 2200 proceeds to STEP 2220. If the digital asset generation platform 100 cannot identify the key value data pairs 140, the method 2200 proceeds to STEP 2210.

In STEP 2210, in some embodiments, the digital asset generation platform 100 may utilize the object detector engine 114 to generate fiducial markings based on the object model. The multi-stage convolutional neural network 110 may include an object detector engine 114, which may correspond to a second stage of the multi-stage convolutional neural network 110. In some embodiments, the multi-stage convolutional neural network 110 may utilize the object detector engine 114 for detecting, classifying, and/or localizing elements in the at least one digital file 104. For example, as shown in FIG. 10, the object detector engine 114 may detect regions in the document 108 based on its document type for classification and/or localization. In another example, as shown in FIG. 11, the object detector engine 114 may classify and/or localize tables, paragraphs, logos, and signatures. In yet another example, object detector engine 114 may classify and/or localize signatures, logos, paragraphs, tables, boxes, QR codes, stamps, graphics, and/or companies.

The object detector engine 114 may localize data elements into one or more fiducial markings (e.g., bounding boxes enclosing the raw OCR output). For example, as shown in FIG. 12, the one or more fiducial markings 1202 may be localized bounding boxes that are overlaid over data elements 1204, which may be regions in the document. In some embodiments, the fiducial markings may be bounding boxes overlaid on regions in the digital file 104 corresponding to the one or more documents 108. In another example, the fiducial markings may be bounding boxes and the data elements may be regions in the document. In some embodiments, the one or more fiducial markings may include or encompass values such as payment number, invoice number, invoice date, currency, invoice amount, and/or amount paid. In some embodiments, the one or more fiducial markings may include tables, signatures, logos, QR, stamps, and/or graphics.

The object detector engine 114 may capture the data elements in the one or more documents 108 by generating the one or more fiducial markings. The object detector engine 114 may generate the fiducial markings to enclose the data elements. In some embodiments, the object detector engine 114 may iteratively generate one or more fiducial markings overlaid on one or more data elements in the at least one digital file 104 based at least in part on the at least one data object model corresponding to the document type of the document 108. In some embodiments, the object detector engine 114 may receive, from the dynamic mapping configurator 150, mapping templates 115 corresponding to the at least one data object model. The object detector engine 114 may generate the fiducial markings based on the mapping templates 115 corresponding to the at least one data object model. In some embodiments, the object detector engine 114 may generate the fiducial markings in which to detect the dynamic mapping.

Referring back to FIG. 22, in STEP 2212, in some embodiments, the digital asset generation platform 100 may utilize the object detector engine 114 to identify spatial correlations between the fiducial markings and the elements. In some embodiments, the object detector engine 114 may identify, for each of the one or more fiducial markings, a spatial correlation between a respective fiducial marking of the one or more fiducial markings and a respective data element of the one or more data elements. For example, the spatial correlation may represent an association between the data element and the fiducial marking. In another example, the spatial correlation indicates the extent to which the fiducial marking (e.g., bounding box) encloses the data elements (e.g., document object). In some embodiments, the object detector engine 114 may identity the spatial correlation based at least in part on the at least one data object model corresponding to the document type of the document 108. In some embodiments, the object detector engine 114 may receive, from the dynamic mapping configurator 150, mapping templates 115 corresponding to the at least one data object model. The object detector engine 114 may identify the spatial correlation based on the mapping templates 115 corresponding to the at least one data object model.

In STEP 2214, in some embodiments, the digital asset generation platform 100 may utilize the object detector engine 114 to generate a dynamic mapping between the fiducial markings and the elements based on the spatial correlation. In some embodiments, the object detector engine 114 may detect, for each respective fiducial marking of the one or more fiducial markings associated with a respective spatial correlation meeting or exceeding a loss metric criterion, a dynamic mapping between the respective fiducial marking and the respective data element of the one or more data elements. For example, the loss metric criterion may define a predetermined spatial correlation at which the fiducial marking (e.g., bounding box) is expected to enclose the data element (e.g., document object). The dynamic mapping may identify objects such as tables, paragraphs, logos, or signatures.

In some embodiments, the object detector engine 114 may provide or transmit the dynamic mapping to the signature identity recognition engine 116. In some embodiments, the object detector engine 114 may provide or transmit the dynamic mapping to the post-processing engine 130.

In some embodiments, the object detector engine 114 may utilize the loss metric criterion based at least in part on the at least one data object model corresponding to the document type of the document 108. In some embodiments, the object detector engine 114 may receive from the dynamic mapping configurator 150, mapping templates 115 corresponding to the at least one data object model. The object detector engine 114 may utilize the loss metric criterion based on the mapping templates 115 corresponding to the at least one data object model. In some embodiments, the object detector engine 114 may generate the dynamic mapping based at least in part on the at least one data object model corresponding to the document type of the document 108. In some embodiments, the object detector engine 114 may receive from the dynamic mapping configurator 150, mapping templates 115 corresponding to the at least one data object model. The object detector engine 114 may generate the dynamic mapping based on the mapping templates 115 corresponding to the at least one data object model.

The object detector engine 114 may modify the one or more fiducial markings. In some embodiments, the object detector engine 114 may modify the one or more fiducial markings by combining or augmenting the one or more fiducial markings. For example, as shown in FIG. 13, the object detector engine 114 may join bounding boxes (e.g., fiducial markings) by combining or extending the bounding boxes (e.g., fiducial markings).

In some embodiments, the object detector engine 114 may modify the one or more fiducial markings based on the spatial correlation. In some embodiments, the object detector engine 114 may modify the one or more fiducial markings based on the spatial correlation not meeting or exceeding a loss metric criterion. For example, the object detector engine 114 may augment fiducial markings based on one or more fiducial markings not independently encompassing a respective element. In some embodiments, if the fiducial markings do not contain both key names and their respective values (e.g., two pieces of information to identify and/or extract the key value data pairs 140), then the distance search (e.g., search for adjacent or similar elements to identify and/or extract the key value data pairs 140) may be found to be inconsistent. In some embodiments, the fiducial markings might not extend to be multiple lines and values that appear under keys might not be combined by the object detector engine 114.

The object detector engine 114 may join or modify the fiducial markings along a horizontal axis. In some embodiments, the horizontally extended fiducial marking may include the one or more key value data pairs 140 on the same line joined together in the same fiducial marking. In some embodiments, the object detector engine 114 may generate vertically extended fiducial markings to encompass key value data pairs 140 that are horizontally aligned in the same bounding box. In some embodiments, the object detector engine 114 may generate trapezoidal visual fiducial markings to include key value data pairs 140 such as lines of text. The object detector engine 114 may automatically extract or identify the one or more key value data pairs 140 from the modified (e.g., augmented) and/or generated (e.g., newly created) fiducial markings.

In some embodiments, the object detector engine 114 may automatically determine the loss metric criterion. In some embodiments, the object detector engine 114 may automatically determine the loss metric criterion based on the modified fiducial markings. For example, to analyze elements having new styles or new languages, the object detector engine 114 may monitor performance against new documents 108 with the new style. When the detection of the one or more data elements fails to satisfy the loss metric criterion, the object detector engine 114 may generate a modified loss metric criterion for the new style.

In some embodiments, the object detector engine 114 comprises an asymmetric loss function that maintains the loss metric criterion. In some embodiments, the object detector engine 114 may use the asymmetric loss function to verify that the fiducial marking (e.g., bounding box) encloses the data elements (e.g., document object). In some embodiments, the asymmetric loss function maintains the loss metric criterion for scale invariance, which can be the that the similarity between two arbitrary shapes A and B (e.g., fiducial marking and the element) is independent of the scale of their space S. In some embodiments, the asymmetric loss function maintains the loss metric criterion for fiducial markings, which defines the asymmetric metric is bounded by intersection over union (IoU). In some embodiments, the asymmetric loss function maintains the loss metric criterion that a distance, such as LIoAU=1−IoAU (Adaptive Intersection over Union), maintains the non-negativity properties of a metric. In some embodiments, the asymmetric loss function maintains the loss metric criterion as a triangle inequality, which can be L (A, B)<L (A, B)+L (B, C). In some embodiments, the asymmetric loss function maintains the loss metric criterion that is an identity of indiscernible, such as if L(A,B)=0, then A and B are indiscernible. In some embodiments, the aforementioned five conditions are required for the loss metric criterion. However, the loss metric criterion is not required to be symmetric for object detection and segmentation. In some embodiments, the asymmetric loss function maintains the loss metric criterion that is not symmetric, e.g., such that L(A,B) is not equal to L(B,A).

The object detector engine 114 may utilize the asymmetric loss function to enable a more accurate and precise localization of elements, such as tables. The asymmetric loss function may utilize the loss metric criterion to ensure that the fiducial marking (e.g., bounding box) encloses the entire element, such as a table, by applying greater penalty to an undersized fiducial marking (e.g., not fully surrounding an element) than to an oversized fiducial marking (e.g., surrounding greater than the element).

For example, A can be a ground truth and B can be the prediction. If IoU=B/A, GIoU=B/A, then Antisymmetric IoU=B/(A+Penalty). The object detector engine 114 may apply a penalty when the prediction BB is not preserving the entire object (ground truth). For example, based on the penalty, IoU=A/B, GIoU=A/B, and Antisymmetric IoU=A/B. In another example, based on the loss metric criterion, the asymmetric loss function may penalize the fiducial marking if it does not enclose the data element (e.g., slightly bigger than the data element). The asymmetric loss function may use the loss metric criterion to ensure that the data element is captured in the fiducial marking. For example, based on the loss metric criterion, the asymmetric loss function may ensure that the entire data element is captured in the fiducial marking for analysis. In another example, the loss metric criterion may be for the one or more fiducial markings to be non-negative and bounded. Thus, the asymmetric loss function may be optimized to enable the object detector engine 114 to surround an element more quickly and efficiently by employing less emphasis on fitting the fiducial marking precisely to the size of the element and instead weighting more heavily for fully enclosing the fiducial marking by the bounding box.

The object detector engine 114 may classify and localize the data elements in the one or more documents 108. In some embodiments, as shown in FIG. 14A, the object detector engine 114 may include one or more convolutional layers for classification and localization of the elements. The layers may be knowledge layers and/or task-specific knowledge layers. The layers may include a single shot multi-box detector with a residual layer.

In some embodiments, as shown in FIG. 14B, the object detector engine 114 may include a backbone with a convolution block and up-sample block. The head (e.g., top of the convolution network) may provide or transmit output to a feature extractor or object detector with one or more convolution and up-sample blocks. The feature extractor or object detector may provide or transmit output to a feature pyramid. The feature pyramid may provide or transmit output to one or more heads, which may include convolution blocks. The heads may provide or transmit output to the asymmetric loss function, which may include cross entropy loss, L1 loss, and objectless loss. The object detector engine 114 may include a concatenate block with a convolution filter based on filter size in dim and out dim with inject points.

In STEP 2216, in some embodiments, the digital asset generation platform 100 may attempt to identify key value pairs 140 from the data elements based on the dynamic mapping. In some embodiments, the digital asset generation platform 100 may extract or identify the one or more key value data pairs 140 from the data elements based on the dynamic mapping. For example, the digital asset generation platform 100 may use the dynamic mapping to generate the key value data pairs 140, which may include JSON, documents, and/or objects for smart contracts. If the digital asset generation platform 100 identifies the key value data pairs 140, the method 2200 proceeds to STEP 2220. If the digital asset generation platform 100 cannot identify the key value data pairs 140, the method 2200 proceeds to STEP 2218.

In STEP 2218, in some embodiments, the digital asset generation platform 100 may utilize the object identifier engine 120 to extract or identify the key value data pairs 140 from the dynamic mapping. The multi-stage convolutional neural network 110 may include an object identifier engine 120, which may correspond to a third stage of the multi-stage convolutional neural network 110. In some embodiments, the multi-stage convolutional neural network 110 may utilize the object identifier engine 120 for identifying the dynamic mapping in the at least one digital file 104. For example, the object identifier engine 120 may analyze or classify the dynamic mapping.

The multi-stage convolutional neural network 110 may include a signature identity recognition engine 116, which may correspond to a third stage of the multi-stage convolutional neural network 110. In some embodiments, the signature identity recognition engine 116 may receive the dynamic mapping from the object detector engine 114. The signature identity recognition engine 116 can be used for identifying one or more digital objects (e.g., signatures and/or logos) in the dynamic mapping in the at least one digital file. In some embodiments, the signature identity recognition engine 116 may extract or identify the one or more digital objects from the dynamic mapping between the respective fiducial marking and the respective data element of the one or more data elements. The signature identity recognition engine 116 may include one or more serial convolution layers for processing the key value data pairs 140. For example, the signature identity recognition engine 116 may be trained for signature identification that may be utilized in identifying or validating signatures for smart contracts. In some embodiments, as shown in FIG. 19, the signature identity recognition engine 116 may include a CNN. In some embodiments, as shown in FIG. 19, the signature identity recognition engine 116 may include one or more layers to analyze the signatures. The signature identity recognition engine 116 may transform the one or more digital objects from original to change background to parallel light with angle to spotlight to cropping to rotation. As shown in FIG. 20, the signature identity recognition engine 116 may maintain training and validation accuracy. As shown in FIG. 21, the signature identity recognition engine 116 may identify training and validation loss in the one or more digital objects. In some embodiments, the signature identity recognition engine 116 may provide or transmit the one or more digital objects to the mapping configurator 150.

The digital asset generation platform 100 may include an object identifier engine 120. In some embodiments, the digital asset generation platform 100 may utilize the object identifier engine 120 for identifying one or more text objects. In some embodiments, as shown in FIG. 1A, in a series configuration, the digital asset generation platform 100 may utilize the object identifier engine 120 for identifying one or more text objects in the dynamic mapping generated by the object detector engine 114. In the series configuration, the digital asset generation platform 100 may utilize the object identifier engine 120 to identify the one or more text objects after the object detector engine 114 generates the dynamic mapping. The post-processing engine 130 may receive the dynamic mapping from the object detector engine 114, and then the post-processing engine 130 may wait to receive the one or more text objects since the one or more text objects will be generated from the dynamic mapping.

In some embodiments, as shown in FIG. 1B, in a parallel configuration, the digital asset generation platform 100 may utilize the object identifier engine 120 for identifying one or more text objects in the digital representation 107 based on the data object models generated by the document identification engine 112. In the parallel configuration, the digital asset generation platform 100 may utilize the object identifier engine 120 in parallel (e.g., simultaneously) with the object detector engine 114 generating the dynamic mapping. The post-processing engine 130 may receive in parallel (e.g., simultaneously) the dynamic mapping from the object detector engine 114 and the one or more text objects from the document identification engine 112.

In some embodiments, the object identifier engine 120 may extract or identify one or more text objects from the dynamic mapping. In some embodiments, the object identifier engine 120 includes a natural language processing model (e.g., OCR text detection) to extract or identify one or more text objects from the dynamic mapping. For example, the natural language processing model may identify text in languages such as English, Chinese, Arabic, German, French, and/or Spanish. In some embodiments, the object identifier engine 120 may query an OCR cloud service. The OCR cloud service may include a parser. The object identifier engine 120 may use the natural language processing model to digitize the one or more digital files 104. In some embodiments, the natural language processing model may be trained from less than 40 image documents.

In some embodiments, the post-processing engine 130 for generating the key value data pairs 140 may include an entity relationship mapping engine 134, an NLP engine 136, and a legal entity recognition engine 138. In some embodiments, the post-processing engine 130 may receive the dynamic mapping from the object detector engine 114. For example, the post-processing engine 130 may analyze or classify the dynamic mapping. In some embodiments, the post-processing engine 130 may receive the one or more text objects from the object identifier engine 120. For example, the post-processing engine 130 may analyze or classify the one or more text objects.

In some embodiments, the post-processing engine 130 may extract or identify one or more key value data pairs 140. In some embodiments, the post-processing engine 130 may extract or identify the one or more key value data pairs 140 from the dynamic mapping between the respective fiducial marking and the respective data element of the one or more data elements. In some embodiments, the post-processing engine 130 may automatically extract or identify the one or more key value data pairs 140 from the dynamic mapping based on the data element of the one or more data elements and the at least one fiducial marking of the one or more data elements meeting or exceeding the spatial correlation. For example, as shown in FIG. 10, the key value data pairs 140 may be pairs of names and companies. In another example, as shown in FIG. 16, the one or more key value data pairs 140 may be that a document type is an insurance policy, a permitted limit due date is 15 days, and/or the no fee period is 60 days. In some embodiments, the object identifier engine 120 may generate an output of key value data pairs 140, which may include JSON, documents, and/or objects for smart contracts. In some embodiments, the post-processing engine 130 may provide or transmit the key value data pairs 140 to the mapping configurator 150 for analysis.

In some embodiments, the post-processing engine 130 may extract or identify the key value pairs 140 based at least in part on the at least one data object model corresponding to the document type of the document 108. In some embodiments, the post-processing engine 130 may receive from the dynamic mapping configurator 150, mapping templates 115 corresponding to the at least one data object model. The post-processing engine 130 may extract or identify the key value pairs 140 based on the mapping templates 115 corresponding to the at least one data object model. In some embodiments, the post-processing engine 130 may extract or identify the one or more key value data pairs 140 from the dynamic mapping based on the one or more text objects generated by the object identifier engine 120. In some embodiments, the post-processing engine 130 may extract or identify the one or more key value data pairs 140 based on the dynamic mapping and the one or more text objects.

The post-processing engine 130 may utilize the entity relationship mapping engine 134 for entity relationship mapping to identify the entity (e.g., company) associated with the key value data pairs 140. The entity relationship mapping engine 134 may include OCR. The post-processing engine 130 may utilize the entity relationship mapping engine 134 for entity relationship mapping by using natural language processing. In some embodiments, the post-processing engine 130 may utilize the entity relationship mapping engine 134 for Named Entity Recognition (NER-NLP) to extract or identify the one or more key value data pairs 140. In some embodiments, the post-processing engine 130 may utilize the entity relationship mapping engine 134 for Named Entity Recognition (NER-NLP) for Legal Sentiment Analysis. For example, the digital asset generation platform 100 may use Natural Language Processing (NLP) for Named Entity Recognition (NER-Transformers) of text to parse key value pairs 140 when only the value is presented (e.g., value only).

In some embodiments, the post-processing engine 130 may utilize an NLP engine 136 to identify or classify key value data pairs 140 that are similar to headers 117 and training values 119 of the mapping templates 115. The NLP engine 136 may utilize fuzzy matching for different types of matching, such as simple text matching, target value matching, and table-specific matching (e.g., outside scope of the key value data pairs 140). The training values 119 values may be target values, which may include payment number, invoice number, invoice date, currency, invoice amount, amount paid, and/or other target values based on the domain of the document or any combination thereof.

In some embodiments, the post-processing engine 130 may utilize a legal entity recognition engine 138. In some embodiments, the post-processing engine 130 may utilize the legal entity recognition engine 138 to identify and classify the names of legal organizations in the key value data pairs 140. For example, the post-processing engine 130 may utilize the legal entity recognition engine 138 to analyze the key value data pairs 140 to identify all the legal entities in the ingest input 102. To identify the legal entities, the post-processing engine 130 may utilize the legal entity recognition engine 138 to compare the key value data pairs 140 with a data store containing known legal entities.

In some embodiments, the mapping configurator 150 can be used for classifying the key value pairs 140. The dynamic mapping configurator 150 may utilize the mapping templates 115 to analyze the key value pairs 140. The dynamic mapping configurator 150 may apply the mapping templates 115 manually or automatically based on how incoming data is configured. In some embodiments, the dynamic mapping configurator 150 may apply the mapping templates 115 based on the input document 108, the data object model, and/or the key value data pairs 140. In some embodiments, the dynamic mapping configurator 150 may select the mapping templates 115 based on the data object model.

In STEP 2220, in some embodiments, the digital asset generation platform 100 may dynamically generate the digital asset 160. In some embodiments, the dynamic mapping configurator 150 may dynamically generate a digital asset 160 representative of the one or more documents 108 based on the one or more key value data pairs 140 extracted or identified from the dynamic mapping between each fiducial marking of the one or more fiducial markings and the respective data element of the one or more data elements. For example, the digital asset 160 may be a self-executing smart contract generated from the one or more documents 108 that include purchase orders, invoices, and/or policies.

In some embodiments, the digital asset 160 may include a multi-cell matrix 162. In some embodiments, the multi-cell matrix 162 may include one or more headers 117 defined by the mapping templates 115. In some embodiments, the mapping templates 115 can correspond to the data object model. For example, as shown in FIG. 15, the mapping configurator 150 may generate a table cell with a value (e.g., multi key value). The mapping configurator 150 may generate the multi-cell matrix 162 using the augmented overlap (e.g., enlarged fiducial markings) between the cells (e.g., overlap matrix based on the dynamic mapping).

In some embodiments, the mapping configurator 150 may generate the digital asset 160 to include the multi-cell matrix 162 with one or more headers 117 to organize the key value data pairs 140. In some embodiments, to generate the digital asset 160, the mapping configurator 150 may generate, based on the one or more key value data pairs 140, the multi-cell matrix 162 with the at least one header 117 and the key value data pairs 140. In some embodiments, the mapping configurator 150 may generate the digital asset 160 comprising the one or more key value data pairs 140 in the multi-cell matrix 162 having the at least one header 117.

In some embodiments, to populate the key value data pairs 140 in the matrix 162 based on the headers 117, the mapping configurator 150 may identify a respective header 117 associated with respective key value data pairs 140. For example, as shown in FIG. 17, the mapping configurator 150 may identify one or more training values 119 of the mapping template 115. The dynamic mapping configurator 150 may insert each key value data pairs 140 based on its respective to header 117 to organize key value data pairs 140 in the matrix 162. In some embodiments, based on the key value data pairs 140 and the mapping templates 115, the mapping configurator 150 may identify the one or more headers 117 associated with the key value data pairs 140 to generate a table (e.g., matrix 162).

In some embodiments, the mapping configurator 150 may generate the digital asset 160 comprising the one or more key value data pairs by comparing the one or more training values 119 with the one or more key value data pairs 140. In some embodiments, the mapping configurator 150 may compare the key value data pairs 140 with the training values 119 of the templates 115 to identify the one or more headers 117. For example, if a particular key value data pairs are (currency, USD), then the mapping configurator 150 may identify headers for "Payment Currency" under which to insert the particular key value data pairs.

As shown in FIG. 18, the dynamic mapping configurator 150 may display an interface for displaying the digital asset 160 generated based on the mapping templates 115. The dynamic mapping configurator 150 may leverage the mapping templates 115 by applying the mapping templates 115 to the ingest input 102 to obtain parsed results (e.g., key value data pairs 140). The dynamic mapping configurator 150 may display the parsed results. The dynamic mapping configurator 150 may normalize the parsed results into normalized data. The dynamic mapping configurator 150 may validate the normalized data. The dynamic mapping configurator 150 may save the normalized and validated data. The dynamic mapping configurator 150 may display a selectable option to digitize the normalized and validated data to generate the digital asset 160.

At STEP 2222, the dynamic mapping configurator 150 may receive one or more feedback inputs for the digital asset 160. For example, as shown in FIG. 18, the dynamic mapping configurator 150 may receive one or more feedback inputs via the interface. In some embodiments, the dynamic mapping configurator 150 may receive one or more feedback inputs for the key value data pairs 140 in the matrix 162. In some embodiments, the digital asset generation platform 100 may utilize machine learning to train the multi-stage convolutional neural network 110 to impute or correct missing or mistaken information in the key value data pairs 140. For example, the train the multi-stage convolutional neural network 110 may be trained, and GPU/CPU optimized specifically for financial documents. In another example, when the digital asset generation platform 100 identifies a new language or characters, the digital asset generation platform 100 may validate the key value data pairs 140 to test the multi-stage convolutional neural network 110 against the new language and characters.

In some embodiments, the dynamic mapping configurator 150 may receive one or more feedback inputs to modify the associations between the key value data pairs 140 and the headers 117. In some embodiments, the digital asset generation platform 100 may automatically train the multi-stage convolutional neural network 110 responsive to identifying whether the one or more feedback inputs indicate that the at least one header 117 is associated with the one or more key value data pairs 140. For example, the digital asset generation platform 100 may train the multi-stage convolutional neural network 110 based on whether the headers 117 of the digital asset 160 are related to the extracted key value data pairs 140. The digital asset generation platform 100 may validate the multi-stage convolutional neural network 110 if one or more feedback inputs indicate that the key value data pairs 140 are related to the headers 117.

In some embodiments, the digital asset generation platform 100 may automatically train the multi-stage convolutional neural network 110 to generate the digital asset 160 based on the one or more feedback inputs. In some embodiments, the digital asset generation platform 100 may train one or more stages of the multi-stage convolutional neural network 110 to generate the digital asset 160 based on the one or more feedback inputs. In some embodiments, the re-trained multi-stage convolutional neural network 110 may more accurately detect the dynamic mapping between the elements and the fiducial markings to create a more accurate digital asset 160. In some embodiments, the re-trained multi-stage convolutional neural network 110 may more accurately associate the key value data pairs 140 with the headers 117 to create a more accurate digital asset.

Upon classifying the one or more feedback inputs and retraining the multi-stage convolutional neural network 110, the method 2200 may proceed to STEP 2202 to generate additional digital assets from additional ingest inputs. The digital asset generation platform 100 may thus be an intelligent platform for generating increasingly accurate digital assets.

Figure 23:
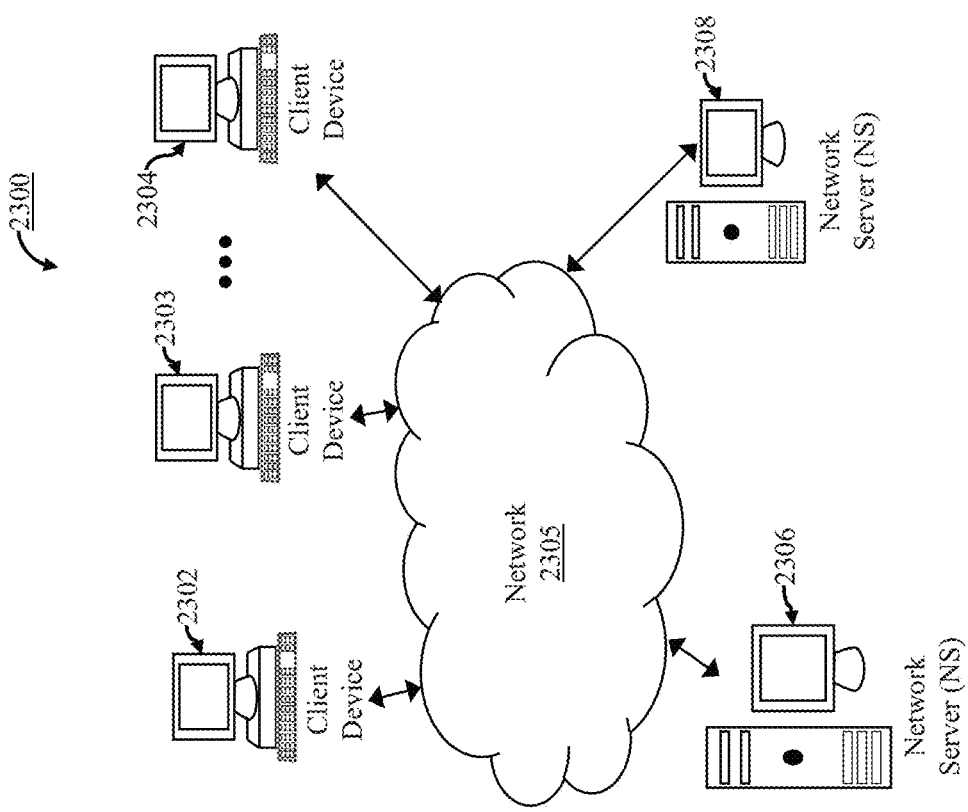

FIG. 23 depicts a block diagram of a computer-based system and platform 2300 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform may be configured to manage a large number of clients and concurrent transactions, as detailed herein. In some embodiments, the exemplary computer-based system and platform 2300 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 23, member computing device 2302, member computing device 2303 through member computing device 2304 (e.g., clients) of the exemplary computer-based system and platform 2300 may include virtually any computing device capable of receiving and sending a message over a network (e.g., cloud network), such as network 2305, to and from another computing device, such as servers 2306 and 2308, each other, and the like. In some embodiments, the member devices 2302-2304 may be personal computers, multiprocessor systems, microprocessor-based or programmable consumer electronics, network PCs, and the like. In some embodiments, one or more member devices within member devices 2302-2304 may include computing devices that typically connect using a wireless communications medium such as cell phones, smart phones, pagers, walkie talkies, radio frequency (RF) devices, infrared (IR) devices, CBs, integrated devices combining one or more of the preceding devices, and/or virtually any mobile computing device, and the like. In some embodiments, one or more member devices within member devices 2302-2304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), AR glasses/lens, and/or any other device that is equipped to communicate over a wired and/or wireless communication medium (e.g., NFC, RFID, NBIOT, 3G, 4G, 5G, GSM, GPRS, Wi-Fi, WiMAX, CDMA, satellite, Bluetooth, ZigBee, etc.).

In some embodiments, one or more member devices within member devices 2302-2304 may run one or more applications, such as Internet browsers, mobile applications, voice calls, video games, videoconferencing, and email, among others. In some embodiments, one or more member devices within member devices 2302-2304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as Hypertext Markup Language (HTML), a wireless application protocol (WAP), a Handheld Device Markup Language (HDML), such as Wireless Markup Language (WML), WMLScript, XML, JavaScript, and the like. In some embodiments, a member device within member devices 2302-2304 may be specifically programmed by either Java, Python .Net, QT, C, C++ and/or other suitable programming language. In some embodiments, one or more member devices within member devices 2302-2304 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 2305 may provide network access, data transport and/or other services to any computing device coupled to it. In some embodiments, the exemplary network 2305 may include and implement at least one specialized network architecture that may be based, at least in part, on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 2305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 2305 may include and implement, as an alternative or in conjunction with one or more of the above, a WiMAX architecture defined by the WiMAX forum. In some embodiments and, optionally, in combination of any embodiment described above or below, the exemplary network 2305 may also include, for instance, at least one of a local area network (LAN), a wide area network (WAN), the Internet, a virtual LAN (VLAN), an enterprise LAN, a layer 3 virtual private network (VPN), an enterprise IP network, and/or any combination thereof. In some embodiments and, optionally, in combination of any embodiment described above or below, at least one computer network communication over the exemplary network 2305 may be transmitted based at least in part on one of more communication modes such as, but not limited to: NFC, RFID, Narrow Band Internet of Things (NBIOT), ZigBee, 3G, 4G, 5G, GSM, GPRS, Wi-Fi, WiMAX, CDMA, satellite and any combination thereof. In some embodiments, the exemplary network 2305 may also include mass storage, such as network attached storage (NAS), a storage area network (SAN), a content delivery network (CDN) or other forms of computer or machine-readable media.

In some embodiments, the exemplary server 2306 or the exemplary server 2308 may be a web server (or a series of servers) running a network operating system, examples of which may include but are not limited to Microsoft Windows Server, Novell NetWare, and/or Linux. In some embodiments, the exemplary server 2306 or the exemplary server 2308 may be used for and/or provide cloud and/or network computing. Although not shown in FIG. 23, in some embodiments, the exemplary server 2306 or the exemplary server 2308 may have connections to external systems like email, SMS messaging, text messaging, ad content providers, etc. Any of the features of the exemplary server 2306 may be also implemented in the exemplary server 2308 and vice versa.

In some embodiments, one or more of the exemplary servers 2306 and 2308 may be specifically programmed to perform, in a non-limiting example, as authentication servers, search servers, email servers, social networking services servers, SMS servers, IM servers, MMS servers, exchange servers, photo-sharing services servers, advertisement providing servers, financial/banking-related services servers, travel services servers, and/or any similarly suitable service-base servers for users of the member computing devices 2302-2304.

In some embodiments and, optionally, in combination of any embodiment described above or below, for example, one or more exemplary computing member devices 2302-2304, the exemplary server 2306, and/or the exemplary server 2308 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), and/or any combination thereof.

In some embodiments, the present disclosure includes a method that includes displaying, by a processor, in an interface accessible to a user via a login, one or more first digital tokens maintained in a first token-holding data structure of a first token-holding data structure provider of a first network. The method may include receiving, by the processor, from the user, a selection of a second network of at least one network associated with a second token-holding data structure provider. The method may include receiving, by the processor, from the user, a selection of a second token-holding data structure provider of at least one token-holding data structure provider associated with the second network. The method may include receiving, by the processor, from the user, a selection of a second token-holding data structure of at least one token-holding data structure associated with the second token-holding data structure provider. The method may include establishing, by the processor, a link to the second token-holding data structure controlling to receiving a verification of relationship of the second token-holding data structure. The method may include receiving, by the processor, via the link, information about one or more second digital tokens maintained in the second token-holding data structure. The method may include displaying, by the processor, in the interface, the one or more first digital tokens maintained in the first token-holding data structure and the one or more second digital tokens maintained in the second token-holding data structure.

The description provides exemplary embodiments only, and is not intended to limit the scope, applicability, and/or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, and/or identically acting elements in the various figures are identified with identical reference numbers and a repeated description of these elements is omitted in part to avoid redundancies.

From the foregoing description, it will be apparent that variations and modifications may be made to the embodiments of the present disclosure to adopt it to various usages and conditions. Such embodiments are also within the scope of the following claims.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof.

Among those benefits and technical solutions that have been disclosed, other objects and advantages of this disclosure may become apparent from the description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although they may. Thus, as described below, various embodiments of the disclosure may be readily combined, without departing from the scope or spirit of the disclosure. Further, when a particular feature, structure, and/or characteristic is described in connection with an implementation, it is submitted within the knowledge of one skilled in the art to effect such feature, structure, and/or characteristic in connection with other implementations whether or not explicitly described herein.

The term "based on" is not exclusive and allows for being based on additional factors not described unless the context clearly dictates otherwise. In addition, throughout the specification, the meaning of "a," "an," and "the" include plural references. The meaning of "in" includes "in" and "on."

It is understood that at least one aspect/functionality of various embodiments described herein may be performed in real-time and/or dynamically. As used herein, the term "real-time" is directed to an event/action that may occur instantaneously or almost instantaneously in time when another event/action is occurring. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" means that events and/or actions may be triggered and/or occur without any human intervention. In some embodiments, events and/or actions in accordance with the present disclosure may be happening in real-time and/or based on a predetermined periodicity of at least one of: nanosecond, several nanoseconds, microsecond, several microseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software language. In this regard, those of ordinary skill in the art are well versed in the type of computer hardware that may be used, the type of computer programming techniques that may be used (e.g., object-oriented programming), and the type of computer programming languages that may be used (e.g., C++, Objective-C, Swift, Java, JavaScript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by at least one processor. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the at least one processor may be implemented as a Complex Instruction Set Computer (CISC) or Reduced Instruction Set Computer (RISC) processors; x86 instruction set compatible processors, multi-core, and/or any other microprocessor, graphics processing unit (GPU), and/or central processing unit (CPU). In various implementations, the at least one processor may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, and/or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the term "user" shall have a meaning of at least one user.

What is claimed is:

1. A computer-implemented method comprising:
ingesting, by at least one processor of a digital asset generation platform, an ingest input that comprises at least one digital file in at least one digital format for a digital representation of one or more documents;
utilizing, by the at least one processor of the digital asset generation platform, a document identification engine corresponding to a first stage of a multi-stage convolutional neural network for identifying one or more document types of the one or more documents by automatically:
identifying at least one data object model of one or more data object models for the one or more documents;
wherein the at least one data object model corresponds to the one or more document types;
utilizing, by the at least one processor of the digital asset generation platform, an object detector engine corresponding to a second stage of the multi-stage convolutional neural network for detecting a dynamic mapping in the at least one digital file by automatically:
iteratively generating, by the at least one processor of the digital asset generation platform, one or more fiducial markings overlaid on one or more data elements in the at least one digital file based at least in part on the at least one data object model;

identifying, for each of the one or more fiducial markings, a spatial correlation between:
a respective fiducial marking of the one or more fiducial markings, and
a respective data element of the one or more data elements; and detecting, for each respective fiducial marking of the one or more fiducial markings associated with a respective spatial correlation meeting or exceeding a loss metric criterion, the dynamic mapping between the respective fiducial marking and the respective data element of the one or more data elements;

utilizing, by the at least one processor of the digital asset generation platform, a post-processing engine for classifying the dynamic mapping in the at least one digital file by automatically:
extracting one or more key value data pairs from the dynamic mapping between the respective fiducial marking and the respective data element of the one or more data elements; and dynamically generating, by the at least one processor of the digital asset generation platform, a digital asset representative of the one or more documents based on the one or more key value data pairs extracted from the dynamic mapping between each fiducial marking of the one or more fiducial markings and the respective data element of the one or more data elements.

2. The computer-implemented method of claim 1, further comprising:
utilizing, by the at least one processor of the digital asset generation platform, a dynamic mapping configurator for identifying mapping templates for the one or more documents by automatically:
selecting, from one or more mapping templates, a mapping template for the at least one data object model; and
identifying one or more training values of the mapping template; and
utilizing, by the at least one processor of the digital asset generation platform, the dynamic mapping configurator for classifying the one or more key value data pairs based on the mapping templates by automatically:
generating the digital asset comprising the one or more key value data pairs by comparing the one or more training values with the one or more key value data pairs.

3. The computer-implemented method of claim 1, further comprising:
utilizing a signature identity recognition engine corresponding to a third stage of the multi-stage convolutional neural network for identifying one or more digital objects in the dynamic mapping in the at least one digital file by automatically:
extracting the one or more digital objects from the dynamic mapping between the respective fiducial marking and the respective data element of the one or more data elements; and
dynamically generating, by the at least one processor of the digital asset generation platform, the digital asset representative of the one or more documents based on the one or more key value data pairs and the one or more digital objects.

4. The computer-implemented method of claim 1, further comprising:

utilizing, by the at least one processor of the digital asset generation platform, an object identifier engine to extract one or more text objects from the dynamic mapping; and
utilizing, by the at least one processor of the digital asset generation platform, the post-processing engine to extract the one or more key value data pairs from the dynamic mapping based on the one or more text objects.

5. The computer-implemented method of claim 1, further comprising:
utilizing, by the at least one processor of the digital asset generation platform, an object identifier engine to extract one or more text objects from the at least one digital file based at least in part on the at least one data object model; and
utilizing, by the at least one processor of the digital asset generation platform, the post-processing engine to extract the one or more key value data pairs from the dynamic mapping based on the one or more text objects.

6. The computer-implemented method of claim 1, wherein dynamically generating the digital asset further comprises:
generating, based on the one or more key value data pairs, a multi-cell matrix with at least one header cell; and
generating the digital asset comprising the one or more key value data pairs in the multi-cell matrix.

7. The computer-implemented method of claim 1, wherein the post-processing engine comprises at least one of, but not limited to:
an entity relationship mapping engine,
a natural language processing engine; and
a legal entity recognition engine.

8. The computer-implemented method of claim 1, further comprising:
automatically training, by the at least one processor of the digital asset generation platform, the multi-stage convolutional neural network to generate the digital asset based on one or more feedback inputs for the digital asset.

9. At least one non-transient computer-readable storage medium encoded with computer-executable instructions that, when executed by at least one processor, cause the at least one processor to perform:
ingesting an ingest input that comprises at least one digital file in at least one digital format for a digital representation of one or more documents;
utilizing a document identification engine corresponding to a first stage of a multi-stage convolutional neural network for identifying one or more document types of the one or more documents by automatically:
identify at least one data object model of one or more data object models for the one or more documents; wherein the at least one data object model corresponds to the one or more document types;
utilizing an object detector engine corresponding to a second stage of the multi-stage convolutional neural network for detecting a dynamic mapping in the at least one digital file by automatically:
iteratively generating one or more fiducial markings overlaid on one or more data elements in the at least one digital file based at least in part on the at least one data object model;
identifying, for each of the one or more fiducial markings, a spatial correlation between:

a respective fiducial marking of the one or more fiducial markings, and a respective data element of the one or more data elements; and detecting, for each respective fiducial marking of the one or more fiducial markings associated with a respective spatial correlation meeting or exceeding a loss metric criterion, the dynamic mapping between the respective fiducial marking and the respective data element of the one or more data elements;

utilizing a post-processing engine for classifying the dynamic mapping in the at least one digital file by automatically:

extracting one or more key value data pairs from the dynamic mapping between the respective fiducial marking and the respective data element of the one or more data elements;

dynamically generating a digital asset representative of the one or more documents based on the one or more key value data pairs extracted from the dynamic mapping between each fiducial marking of the one or more fiducial markings and the respective data element of the one or more data elements; and automatically training the multi-stage convolutional neural network to generate the digital asset based on one or more feedback inputs for the digital asset.

10. The at least one non-transient computer-readable storage medium encoded with computer-executable instructions of claim 9, wherein the computer-executable instructions, when executed by the at least one processor, further cause the at least one processor to perform:

utilizing a dynamic mapping configurator for identifying mapping templates for the one or more documents by automatically:

selecting, from one or more mapping templates, a mapping template for the at least one data object model; and identifying one or more training values of the mapping template; and utilizing the dynamic mapping configurator for classifying the one or more key value data pairs based on the mapping templates by automatically:

generating the digital asset comprising the one or more key value data pairs by comparing the one or more training values with the one or more key value data pairs.

11. The at least one non-transient computer-readable storage medium encoded with computer-executable instructions of claim 9, wherein the computer-executable instructions, when executed by the at least one processor, further cause the at least one processor to perform:

utilizing a signature identity recognition engine corresponding to a third stage of the multi-stage convolutional neural network for identifying one or more digital objects in the dynamic mapping in the at least one digital file by automatically:

extracting the one or more digital objects from the dynamic mapping between the respective fiducial marking and the respective data element of the one or more data elements; and dynamically generating the digital asset representative of the one or more documents based on the one or more key value data pairs and the one or more digital objects.

12. The at least one non-transient computer-readable storage medium encoded with computer-executable instructions of claim 9, wherein the computer-executable instructions, when executed by the at least one processor, further cause the at least one processor to perform:

utilizing an object identifier engine to extract one or more text objects from the dynamic mapping; and utilizing the post-processing engine to extract the one or more key value data pairs from the dynamic mapping based on the one or more text objects.

13. The at least one non-transient computer-readable storage medium encoded with computer-executable instructions of claim 9, wherein the computer-executable instructions, when executed by the at least one processor, further cause the at least one processor to perform:

utilizing an object identifier engine to extract one or more text objects from the at least one digital file based at least in part on the at least one data object model; and utilizing the post-processing engine to extract the one or more key value data pairs from the dynamic mapping based on the one or more text objects.

14. The at least one non-transient computer-readable storage medium encoded with computer-executable instructions of claim 9, wherein the computer-executable instructions, when executed by the at least one processor, further cause the at least one processor to perform, for the dynamically generating the digital asset:

generating, based on the one or more key value data pairs, a multi-cell matrix with at least one header cell; and generating the digital asset comprising the one or more key value data pairs in the multi-cell matrix.

15. The at least one non-transient computer-readable storage medium encoded with computer-executable instructions of claim 14, wherein the computer-executable instructions, when executed by the at least one processor, further cause the at least one processor to perform:

automatically training the multi-stage convolutional neural network responsive to identifying whether the at least one header cell is associated with the one or more key value data pairs.

16. A system comprising:

a non-transient computer memory, storing software instructions; and at least one processor of a computing device associated with a user;

wherein when the at least one processor executes the software instructions, the computing device is programmed to:

ingest, by the at least one processor of a digital asset generation platform, an ingest input that comprises at least one digital file in one or more digital formats for a digital representation of one or more documents;

utilize a document identification engine corresponding to a first stage of a multi-stage convolutional neural network for identifying one or more document types of the one or more documents by automatically:

identifying at least one data object model of one or more data object models for the one or more documents;

wherein the at least one data object model corresponds to the one or more document types;

utilize an object detector engine corresponding to a second stage of the multi-stage convolutional neural network for detecting a dynamic mapping in the at least one digital file by automatically:

generating one or more fiducial markings overlaid on one or more data elements in the at least one digital file based at least in part on the at least one data object model;

identify, for each of the one or more fiducial markings, a spatial correlation between:
  a respective fiducial marking of the one or more fiducial markings, and
  a respective data element of the one or more data elements; and detecting, for each respective fiducial marking of the one or more fiducial markings associated with a respective spatial correlation meeting or exceeding a loss metric criterion, the dynamic mapping between the respective fiducial marking and the respective data element of the one or more data elements; and utilizing a post-processing engine for classifying the dynamic mapping in the at least one digital file by automatically:
  extracting one or more key value data pairs from the dynamic mapping between the respective fiducial marking and the respective data element of the one or more data elements.

17. The system of claim 16, wherein the computing device is further programmed to:

utilize a dynamic mapping configurator for identifying mapping templates for the one or more documents by automatically:
  selecting, from one or more mapping templates, a mapping template for the at least one data object model; and
  identifying one or more training values of the mapping template; and utilize the dynamic mapping configurator for classifying the one or more key value data pairs based on the mapping templates by automatically:
  generating a digital asset representative of the one or more documents, the digital asset comprising the one or more key value data pairs by comparing the one or more training values with the one or more key value data pairs.

18. The system of claim 16, wherein the computing device is further programmed to:

utilize a signature identity recognition engine corresponding to a third stage of the multi-stage convolutional neural network for identifying one or more digital objects in the dynamic mapping in the at least one digital file by automatically:
  extracting the one or more digital objects from the dynamic mapping between the respective fiducial marking and the respective data element of the one or more data elements; and dynamically generate a digital asset that is representative of the one or more documents based on the one or more key value data pairs and the one or more digital objects.

19. The system of claim 16, wherein the computing device is further programmed to:

utilize an object identifier engine to extract one or more text objects from the dynamic mapping; and utilize the post-processing engine to extract the one or more key value data pairs from the dynamic mapping based on the one or more text objects.

20. The system of claim 16, wherein the computing device is further programmed to:

utilize an object identifier engine to extract one or more text objects from the at least one digital file based at least in part on the at least one data object model; and utilize the post-processing engine to extract the one or more key value data pairs from the dynamic mapping based on the one or more text objects.

* * * * *